US012774581B2

(12) United States Patent
Relph et al.

(10) Patent No.: US 12,774,581 B2
(45) Date of Patent: Oct. 27, 2026

(54) WORK MACHINE WITH IMPROVED VIEWING ANGLES

(71) Applicant: Great Plains Manufacturing, Inc., Salina, KS (US)

(72) Inventors: John M. Relph, Abilene, KS (US); Jeff Welsh, Abilene, KS (US); Toshihiko Takemura, Grapevine, TX (US)

(73) Assignee: Great Plains Manufacturing, Inc., Salina, KS (US)

( * ) Notice: Subject to any disclaimer, the term of this patent is extended or adjusted under 35 U.S.C. 154(b) by 397 days.

(21) Appl. No.: 18/533,414

(22) Filed: Dec. 8, 2023

(65) Prior Publication Data

US 2024/0191464 A1 Jun. 13, 2024

Related U.S. Application Data

(60) Provisional application No. 63/387,032, filed on Dec. 12, 2022.

(51) Int. Cl.
*E02F 9/08* (2006.01)
*B62D 33/06* (2006.01)
(Continued)

(52) U.S. Cl.
CPC ............ *E02F 9/08* (2013.01); *B62D 33/0617* (2013.01); *E02F 9/0808* (2013.01);
(Continued)

(58) Field of Classification Search
CPC .. B62D 33/06; B62D 33/0617; B62D 33/067; B62D 55/06; E02F 3/34; E02F 9/08
(Continued)

(56) References Cited

U.S. PATENT DOCUMENTS 8,579,364 B2 * 11/2013 Fukudome ................ E02F 9/08 296/213
11,673,447 B2 * 6/2023 Wada ..................... B62D 25/20 296/190.09
(Continued)

FOREIGN PATENT DOCUMENTS

| | | |
|---|---|---|
| JP | 2001151166 | 6/2001 |
| JP | 2002206253 | 7/2002 |
| JP | 2010163035 | 7/2010 |

OTHER PUBLICATIONS

International Search Report and Written Opinion in related PCT Application PCT/US2023/083402 mailed Apr. 9, 2024, 11 pages.

*Primary Examiner* — Jason S Daniels
(74) *Attorney, Agent, or Firm* — Hovey Williams LLP; Kameron D. Kelly

(57) ABSTRACT

A work machine configured to operate on a ground surface. The work machine comprises a frame, a cab supported by the frame and configured to house an operator of the work machine, and at least one loader arm supported on the frame and shiftable relative to the frame between a raised position and a lowered position. The frame includes (i) a forward portion and a rearward portion, and (ii) a first side and a second side. The first side and the second side are laterally separated from each other. At least the first side of the frame comprises an inner panel and a cover panel at the rearward portion of the frame. The cover panel is spaced outwardly from the inner panel. At least a portion of a top edge of the cover panel is positioned vertically lower than a top edge of the inner panel.

17 Claims, 20 Drawing Sheets

(51) Int. Cl.
*E02F 9/16* (2006.01)
*E02F 9/22* (2006.01)
*E02F 9/20* (2006.01)

(52) U.S. Cl.
CPC .......... *E02F 9/0833* (2013.01); *E02F 9/0891* (2013.01); *E02F 9/16* (2013.01); *E02F 9/163* (2013.01); *E02F 9/2271* (2013.01); *E02F 9/2033* (2013.01)

(58) Field of Classification Search
USPC .......................................... 296/190.01, 190.08
See application file for complete search history.

(56) References Cited

U.S. PATENT DOCUMENTS

| | | | | |
|---|---|---|---|---|
| 2007/0289791 | A1 * | 12/2007 | Kaufmann | B66F 9/10 180/89.1 |
| 2009/0038186 | A1 | 2/2009 | Osswald et al. | |
| 2016/0053459 | A1 * | 2/2016 | Webb | E02F 9/16 296/190.01 |
| 2022/0178104 | A1 | 6/2022 | Kumbhar et al. | |

* cited by examiner

WORK MACHINE WITH IMPROVED VIEWING ANGLES

The present non-provisional patent application claims priority benefit to U.S. Provisional Patent Application Ser. No. 63/387,032, filed Dec. 12, 2022, and entitled "WORK MACHINE." The entirety of the above-identified provisional patent application is hereby incorporated by reference into the present non-provisional patent application.

FIELD OF THE INVENTION

Embodiments of the present invention are generally directed to work machines. More particularly, embodiments of the present invention are directed to compact work machines, such as compact track loaders, which can carry and operate a wide range of attachments while maintaining a reduced operating footprint.

BACKGROUND OF THE INVENTION

Many types of heavy-equipment work machines are on the market today. An exemplary type of work machine is a loader, which is a machine commonly used as a hydraulic tool carrier configured to carry and operate a variety of hydraulically-driven attachments (e.g., implements or tools). Common attachments include augers, trenchers, grapples, etc. Other non-hydraulic attachments may also be carried and operated by loaders, such as buckets, rakes, etc.

Unfortunately, most currently-available loaders are manufactured in large sizes (e.g., having large widths and lengths), which can make the loaders difficult to maneuver and operate. Although there are many jobs that can be efficiently performed by loaders, such as the excavation of building foundations and basements, many residential and commercial real-estate properties have narrow entryways/exits onto the properties. As such, most currently-available loaders are too large to pass through the entryways/exits to access the properties. As a result, there is a need for a work machine, and particularly for a compact loader, having a small, reduced footprint (e.g., length and/or width), so as to provide for improved maneuverability and accessibility within confined spaces.

Furthermore, it would be beneficial to provide such a reduced-footprint work machine that includes improved features for accurately, safely, and efficiently operating the work machine. For example, due to the size of many previously-used work machines, viewing angles of the operators of such work machines were often compromised by the bulky frame components of the work machines. As such, it was often difficult for operators to adequately observe the environment surrounding the work machines.

SUMMARY OF THE INVENTION

One aspect of the present invention concerns a work machine configured to operate on a ground surface. The work machine comprises a frame, a cab supported by the frame and configured to house an operator of the work machine, and at least one loader arm supported on the frame and shiftable relative to the frame between a raised position and a lowered position. The frame includes (i) a forward portion and a rearward portion, and (ii) a first side and a second side. The first side and the second side are laterally separated from each other. At least the first side of the frame comprises an inner panel and a cover panel at the rearward portion of the frame. The cover panel is spaced outwardly from the inner panel. At least a portion of a top edge of the cover panel is positioned vertically lower than a top edge of the inner panel.

Another aspect of the present invention concerns a work machine configured to operate on a ground surface. The work machine comprises a frame and a cab supported by the frame and configured to house an operator of the work machine. The cab includes a window positioned on a rearward-facing side of the cab. The work machine further comprises at least one loader arm supported on the frame and shiftable relative to the frame between a raised position and a lowered position. The frame includes (i) a forward portion and a rearward portion, and (ii) a first side and a second side. The first side and the second side are laterally separated from each other. At least the first side of the frame comprises an inner panel and a cover panel at the rearward portion of the frame. The cover panel is spaced outwardly from the inner panel. The first side of the frame is configured such that a line of sight extending from a center of the window, tangent to a top edge of the inner panel, and to the ground surface does not contact the cover panel.

BRIEF DESCRIPTION OF THE FIGURES

Embodiments of the present invention are described herein with reference to the following drawing figures, wherein.

Figure 1:
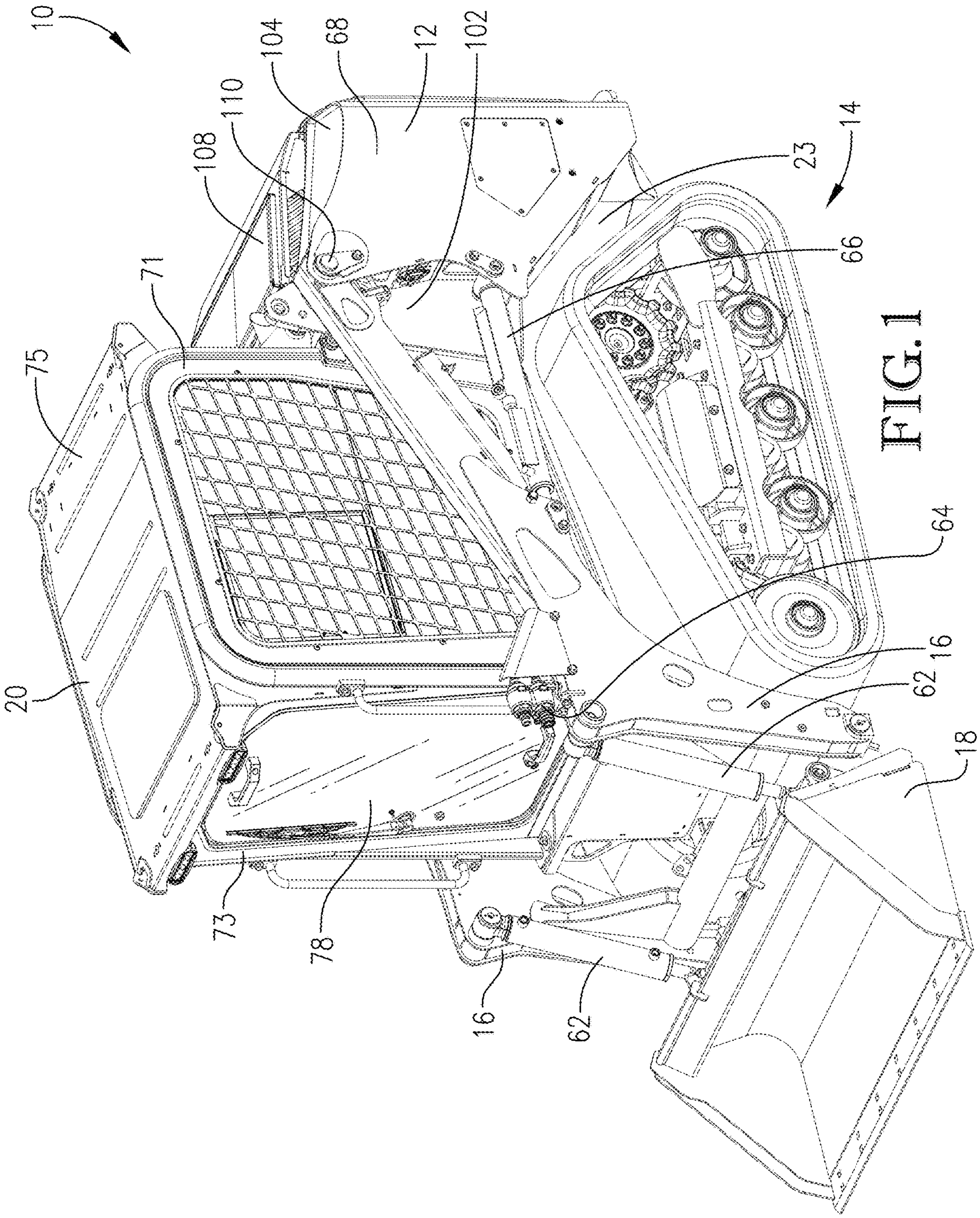
FIG. 1 is a front perspective view of a loader according to embodiments of the present invention.

The figures are not intended to limit the present invention to the specific embodiments they depict. While the drawings do not necessarily provide exact dimensions or tolerances for the illustrated structures or components, the drawings are to scale with respect to the relationships between the components of the structures illustrated in the drawings.

DETAILED DESCRIPTION

The following detailed description of the present invention references various embodiments. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Overview

Figure 9:
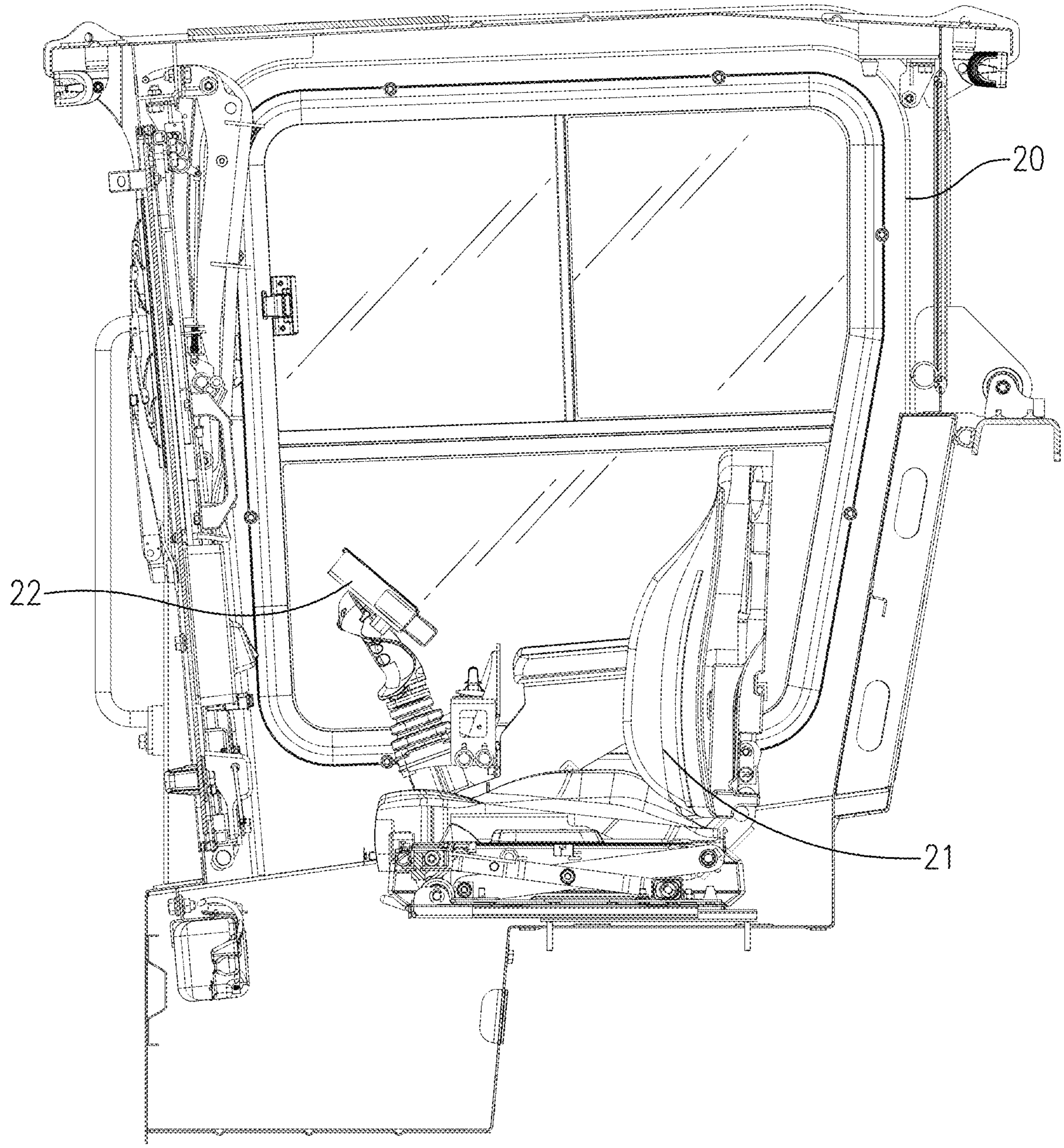
FIG. 9 is a side view of an interior space of a cab of the loader from FIGS. 1-8, with a portion of the cab removed to illustrate user controls of the loader.

Embodiments of the present invention are directed to a work machine, such as a loader 10, as illustrated in exemplary FIGS. 1-8. Broadly, the loader 10 may comprise a frame 12 supported on the ground by a drive assembly 14. As will be discussed in more detail below, in addition to supporting the loader 10 on the ground, the drive assembly 14 is configured to propel the loader 10 over the ground. The loader 10 may additionally comprise one or more, e.g., one loader arm or a pair of loader arms 16 supported by the frame 12 and configured to be raised and lowered. The loader arms 16 are further configured to support various types of attachments 18 for performing various types of work, as required by an operator of the loader 10. The loader 10 may include an operator cab 20 supported by the frame 12. The cab 20 may, as illustrated by FIG. 9, house a seat 21 and one or more user controls 22 (e.g., buttons, switches, levers, joysticks, touchscreen displays, etc.). The user controls 22 may be used by the operator to control various functions of the loader 10, as will be described in more detail below.

As used herein, directional terms are from the perspective of an operator sitting in the seat 21 of the loader 10 in an operating position (i.e., facing a front end of the loader 10). Thus, the terms "front", "forward", or "fore", mean a longitudinal direction towards the front end of the loader 10. It is noted that the attachment 18 is supported at the front end of the loader 10 by connections with front ends of the loader arms 16. The terms "back," "rear", "rearward", or "aft" mean a longitudinal direction towards the back end of the loader 10, i.e., behind the cab 20. The term "left" or "leftward" means a left lateral direction from the perspective of the operator sitting in the cab 20 and facing forward, and the terms "right" or "rightward" means a right lateral direction from the perspective of the operator sitting in the cab 20 and facing forward.

The loader 10 of embodiments of the present invention may comprise a "compact utility loader" or a "CUL," or may specifically comprise a "compact track loader" or "CTL." As used herein the term "loader" means is a self-propelled work machine comprising one or more loader arms configured to support various interchangeable, attachments that are operably connected with front ends of the loader arms. The attachments may be tools that have hydraulically-driven auxiliary functions, such as augers, grinders, tillers, rollers, trenchers, digger derrick, or the like. However, the loader 10 may support non-hydraulic attachments, such as buckets, blades, or the like. Regardless, because the inventive loader 10 of the present invention may be "compact," i.e., having a smaller size and weight than standard loaders, such compact loader may be much more maneuverable and provide more efficient load/weight distribution than standard loaders.

In more detail, in some embodiments, the loader 10 may have a front-to-back length (excluding the attachment 18) of between 60 and 100 inches, between 70 and 90 inches, or about 85 inches. The loader 10 may have a top-to-bottom height (as measured from a bottom of the drive assembly 14 tracks and a top of the cab 20) of between 50 and 100 inches, between 60 and 90 inches, between 70 and 80 inches, or about 85 inches. The loader 10 may have a lateral width (as measured between the outside lateral edges of the drive assembly 14 tracks) of between 36 and 56 inches, between 40 and 52 inches, or about 45 inches. The frame 12 of the loader 10 may have a lateral width (as measured between the outside lateral edges of the frame 12) of between 32 and 52 inches, between 36 and 48 inches, or about 41 inches. In some embodiments, the loader 10 will be configured with a ground clearance (as measured from the ground surface to a bottom side of the frame 12) of between 7 and 12 inches, between 8 and 10 inches, or about 9 inches. Given such dimensional characteristics, the loader 10 is configured with various enhanced features and functionalities (as described in more detail below), yet maintains an overall small footprint so as to increase maneuverability and to enhance accessibility of the loader to confined working areas/spaces.

Beginning with the frame 12 of the loader 10, the frame 12 may broadly form a housing that defines an interior compartment within which various components of the loader 10 (e.g., engine, hydraulic system, etc.) are housed and supported, as will be discussed in more detail below. The frame 12 may comprise a left side 23 (See FIG. 1) and a right side 24 (See FIG. 2), which are spaced apart and separated by/connected together via a bottom side 26 (See FIG. 2). The left side 23 and the right side 24 may each be configured as a sidewall, and the bottom side 26 may be configured as a bottom wall. As such, the frame 12 can present the interior compartment for supporting various components of the loader 10, as will be discussed in more detail below.

Figure 10:
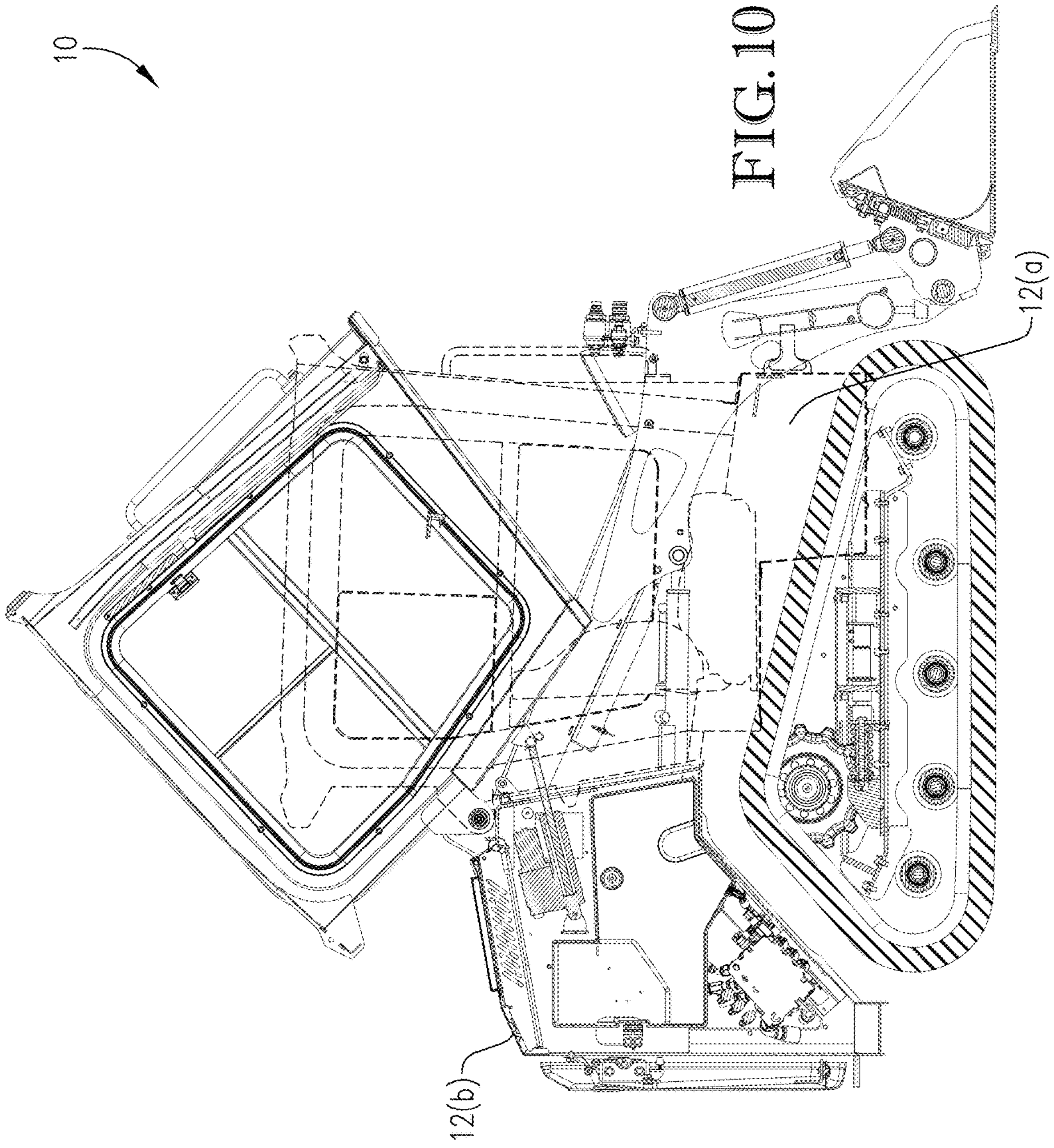
FIG. 10 is a side elevation view of the loader from FIGS. 1-8, with a cab of the loader shown positioned in both a raised position (solid line) and a lowered position (in broken line)
Figure 11:
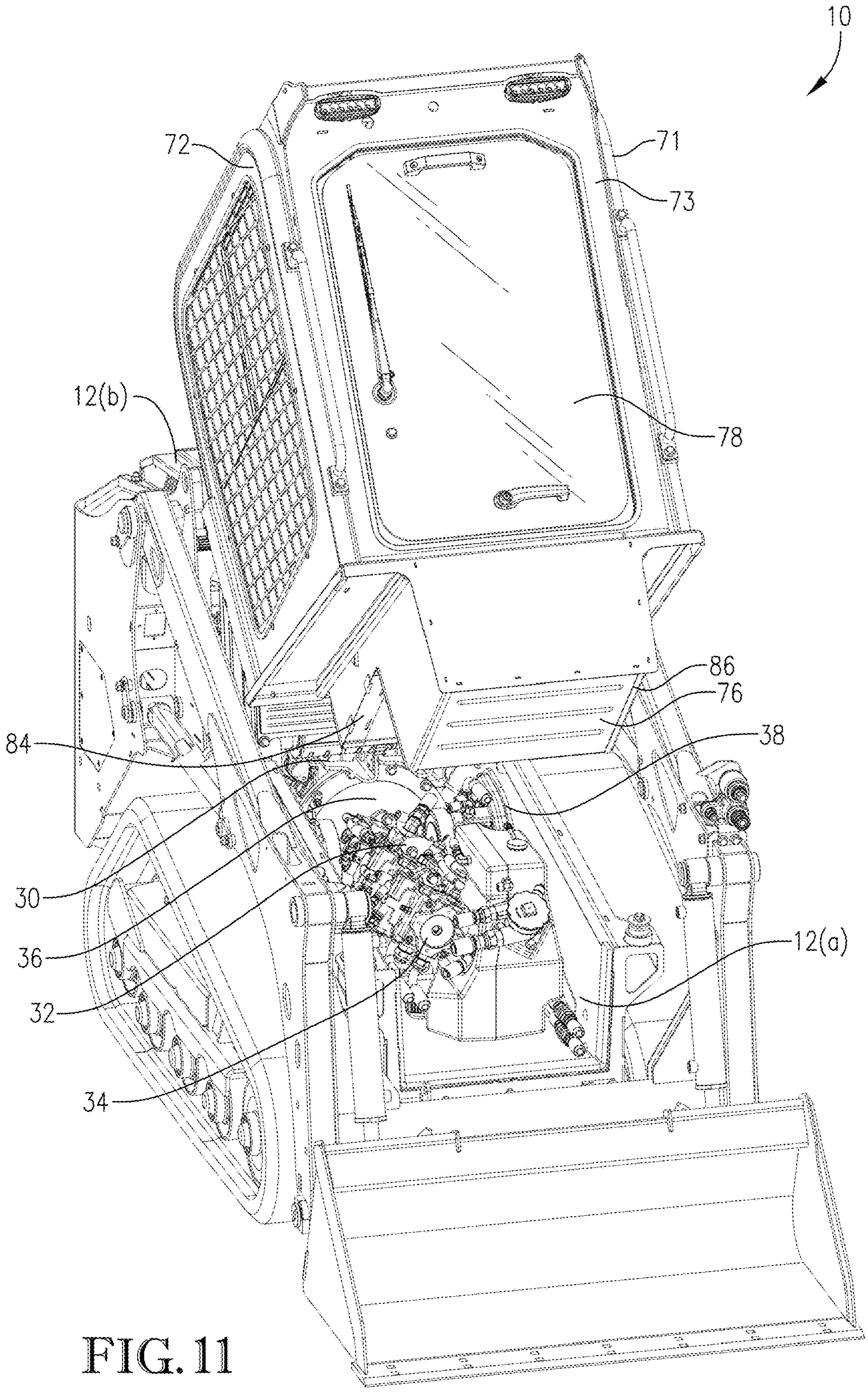
FIG. 11 is a front perspective view of the loader from FIGS. 1-8, with a cab of the loader shown in a raised position.

Furthermore, and with reference to FIGS. 10 and 11, as the frame 12 may comprise a forward portion 12(*a*) and a rearward portion 12(*b*). As such, the frame 12 may extend longitudinally from a rearward end (part of the rearward portion 12(*b*)) to a forward end (part of the forward portion 12(*a*)). In general, the forward portion 12(*a*) of the frame 12 may have a height that is less than height of the rearward portion 12(*b*). In some embodiments, the cab 20 may be hingedly connected to a top of the frame 12, such that the cab 20 can be selectively positioned in a closed, operating position (See, e.g., FIGS. 1 and 2) and an open, raised position (See, e.g., FIGS. 10 and 11). Specifically, as shown in FIG. 10, a back side of the cab 20 may be hingedly connected to a top of the frame 12, near or at a front of the rearward portion 12(*b*) of the frame 12. The hinge connection may be a lateral extending, horizontal connection, such that the cab 20 can be vertically raised and lowered. When in the closed, operating position, a front, lower portion of the cab 20 may be securely coupled, e.g., via threaded fasteners, latches, or other locking mechanisms, to securely hold the cab 20 in place (with respect to the frame 12) in the closed, operating position. Further, the loader 10 may include an access door 28 hingedly connected to the frame 12 at the back end of the loader 10, and configured to be selectively positioned in a closed position (See, e.g., FIGS. 2 and 6) and an open position (See, e.g., FIG. 12). Specifically, in some embodiments, a right side of the access door 28 may be hingedly connected to a back end of the right side 24 of the frame 20. The hinge connection may be a vertical connection, such that the access door 28 can be opened and closed about a vertical axis. A left side of the access door 28 may include a locking mechanism (e.g., a latch) that permits the access door 28 to be selectively coupled with the left side 23 of the frame 12, so as to maintain the access door 28 in the closed position.

In view of the above, the frame 12, in addition to the cab 20 and the access door 28, are configured to present (and selectively enclose) the interior compartment within which various components of the loader 10. Specifically, with the cab 20 and the access door 28 in the closed position, various components of the loader 10 are enclosed within the interior compartment. Furthermore, however, with the cab 20 and/or the access door 28 in the open position, certain of those various components within the interior compartment may be accessed for maintenance, repair, or the like. For example, and with reference to FIG. 11, the interior compartment of the frame 12 may house a power unit, such as a combustion engine 30 of the loader 10, at least a portion of which may be positioned within a rearward portion 12(*b*) of the frame 12. It is noted that in some embodiments, the loader 10 may include a power unit in the form of an electric motor to power the loader 10, in place of (or in addition to) the combustion engine 30.

The interior compartment may additionally house one or more components of a hydraulic system that is used to power one or more hydraulically-powered components of the loader 10. The hydraulic system may comprise a hydraulic auxiliary pump 32 that may be operably connected to a front end of the engine 30, as well as a hydrostatic transmission 34 that may be operably connected to a front end of the auxiliary pump 32. As such, the engine 30 may provide rotary power to each of the auxiliary pump 32 and the hydrostatic transmission 34. As will be described in more detail below, the hydraulic system, and particularly the hydraulic pump 32, may provide hydraulic power to the loader arms 16 and to the attachments 18 of the loader 10, as necessary. The hydraulic system, and particularly the hydrostatic transmission 34, may provide hydraulic power to the drive assembly 14, as discussed in more detail below. In some embodiments, a flywheel 36 may be positioned between the engine 30 and the auxiliary pump 32 and the hydrostatic transmission 34. Such flywheel 36 may be used to maintain a consistent power output from the engine 30 during varying RPMs.

In certain embodiments, the loader 10 may include a pair of drive motors 38 positioned within the interior compartment of the frame 12, on either side of the auxiliary pump 32 (i.e., a left side drive motor 38 and a right side drive motor 38). Such drive motors 38 may be used to provide power to the drive assembly 14. Specifically, the hydrostatic transmission 34 may be configured to provide hydraulic power to the drive motors 38, which in turn provide rotary power to the drive assembly 14 (e.g., tracks or wheels) of the loader 10. In some embodiments, the loader 10 may be in the form of a compact track loader, such that the drive assembly 14 comprises a pair of tracks, as described in more detail below. However, the loader 10 may, alternatively, be propelled by one or more wheels in place of, or in addition to, tracks. Regardless, as discussed above, the interior compartment of the frame 12, may house the engine 30, the auxiliary pump 32, the hydrostatic transmission 34, the flywheel 36, and the drive motors 38, as well as various other components of the loader's 10 hydraulic system (e.g., one or more hydraulic fluid reservoir tank(s) (e.g., a plurality of hydraulic fluid reservoir tanks), filters, ride control valve, accumulator, brake valve, lines/conduits, etc.). In some embodiments, the engine 30 may be positioned within the rearward portion 12(*b*) of the frame 12, while the auxiliary pump 32, the hydrostatic transmission 34, the flywheel 36, and the drive motors 38, as well as various other components of the loader's 10 hydraulic system may be positioned within the forward portion 12(*a*) of the frame 12. Regardless, as described in more detail below, certain components of the loader's 10 hydraulic system may be positioned within the rearward portion 12(*b*) of the frame 12.

Figure 12:
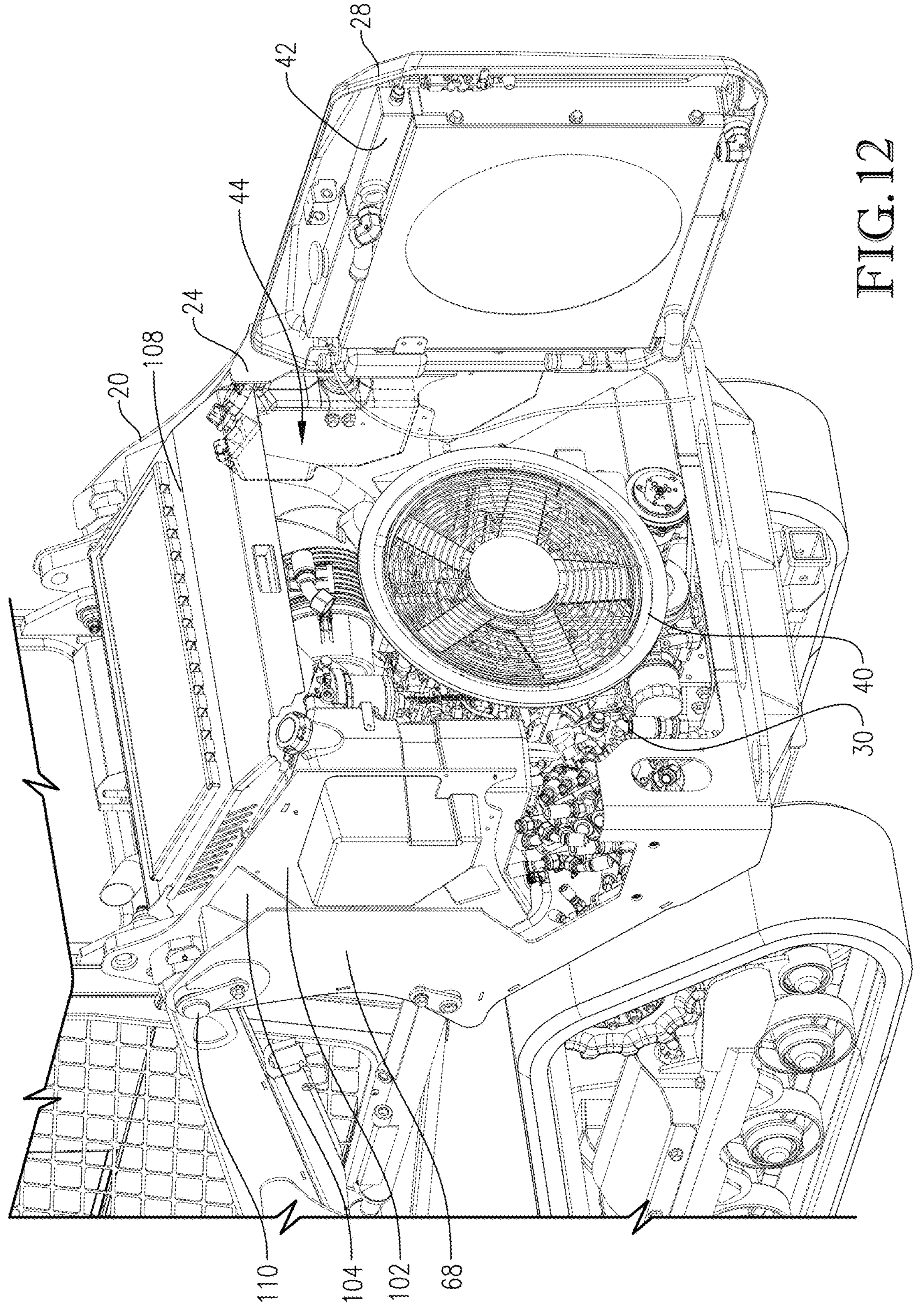
FIG. 12 is a rear perspective view of the loader from FIGS. 1-8, with a rear access door of the loader illustrated in an open position.
Figure 13:
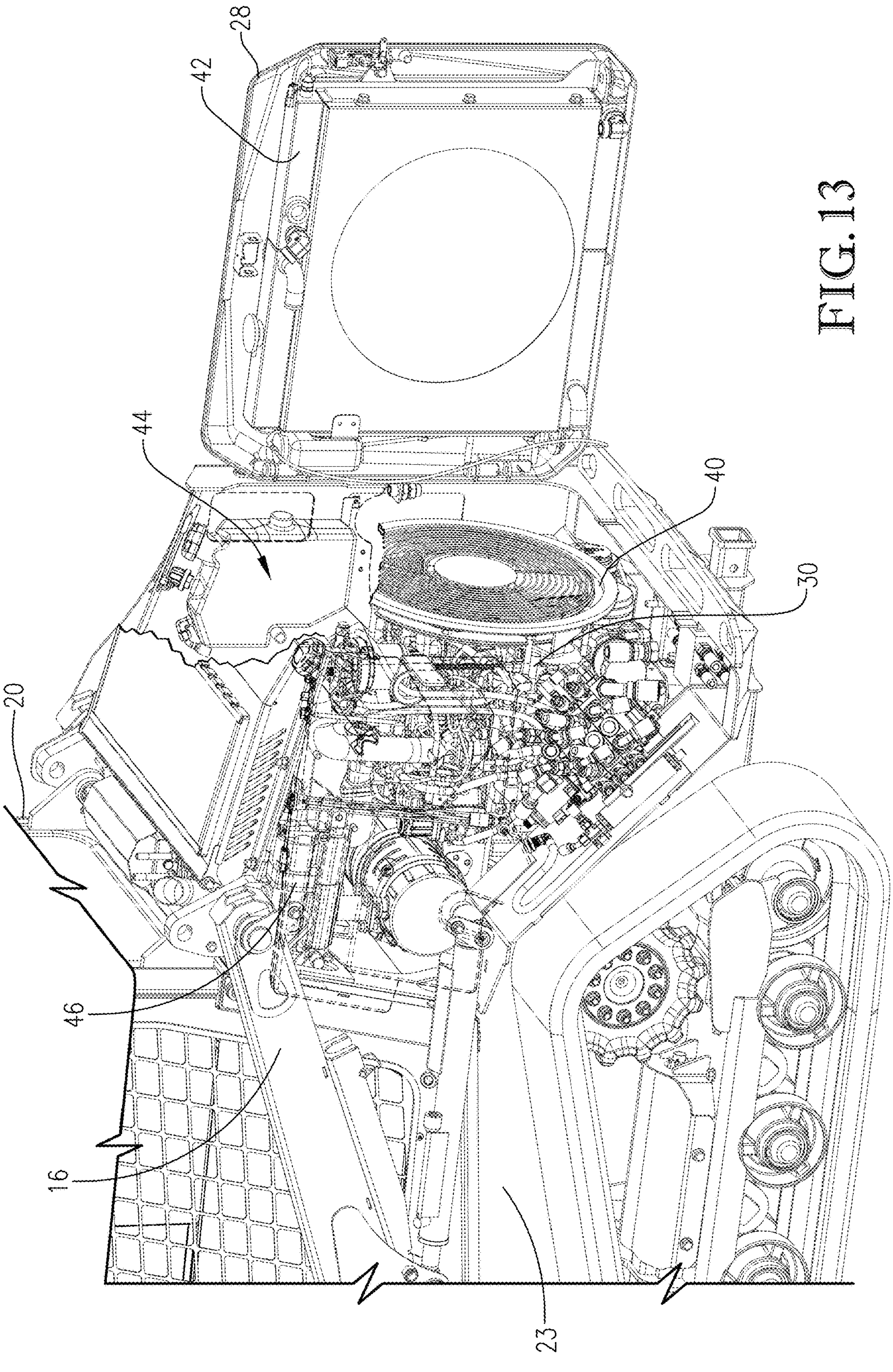
FIG. 13 is another rear perspective view of the loader from FIGS. 1-8, with a portion of a frame of the loader cut away to illustrate internal components of the loader.

Turning to the rearward portion 12(*b*) of the frame 12 in more detail, as illustrated in FIGS. 12 and 13, various components of the loader 10 may be positioned within the internal compartment presented by the rearward portion 12(*b*). For instance, as noted previously, the engine 30 (or at least a portion thereof) may be positioned within the rearward portion 12(*b*) of the frame 12. A cooling system may be positioned rearward of the engine 30. In particular, the cooling system may comprise a fan 40 attached to a rear side of the engine 30. The cooling system may additionally comprise a radiator 42 positioned rearward of the fan 40. In some embodiments, as will be described in more detail below, the radiator 42 may be attached to the access door 28 and configured to rotate open and closed (with respect to the fan 40) in conjunction with the access door 28. In addition, the rearward portion 12(*b*) of the frame 12 may house a heating, ventilation, and air-conditioning ("HVAC") system 44, which is configured to provide temperature controlled airflow to the cab 20, as will be discussed in more detail below. Furthermore, the rearward portion 12(*b*) of the frame 12 may house an actuator 46, as shown in FIG. 13, in operable engagement with the cab 20 and configured to selectively shift the cab 20 between open and closed positions, as noted above and as will be discussed in more detail below. The actuator may comprise an electro-hydraulic actuator, as well as various other types linear actuators. Finally, the rearward portion 12(*b*) of the frame 12 may house various other components of the loader, such as components of the loader's 10 electrical system (e.g., battery, engine 30 starter, alternator), fuel tank, associated cables/lines, etc.

Notably, the cab 20 and the access door 28 being configured to selectively open and close provide access to the interior compartment of the frame 12. For example, the cab 20 can be raised to the open position to provide access to the engine 30, the auxiliary pump 32, the hydrostatic transmission 34, the flywheel 36, the drive motors and/or various other components of the loader's 10 hydraulic system. The access door 28 can be opened to provide access to the engine 30, the cooling system (e.g., the fan 40 and radiator 42), the HVAC system 44, electrical system, and/or other related components. Such access can facilitate efficient service and maintenance of the loader 10.

Figure 4:
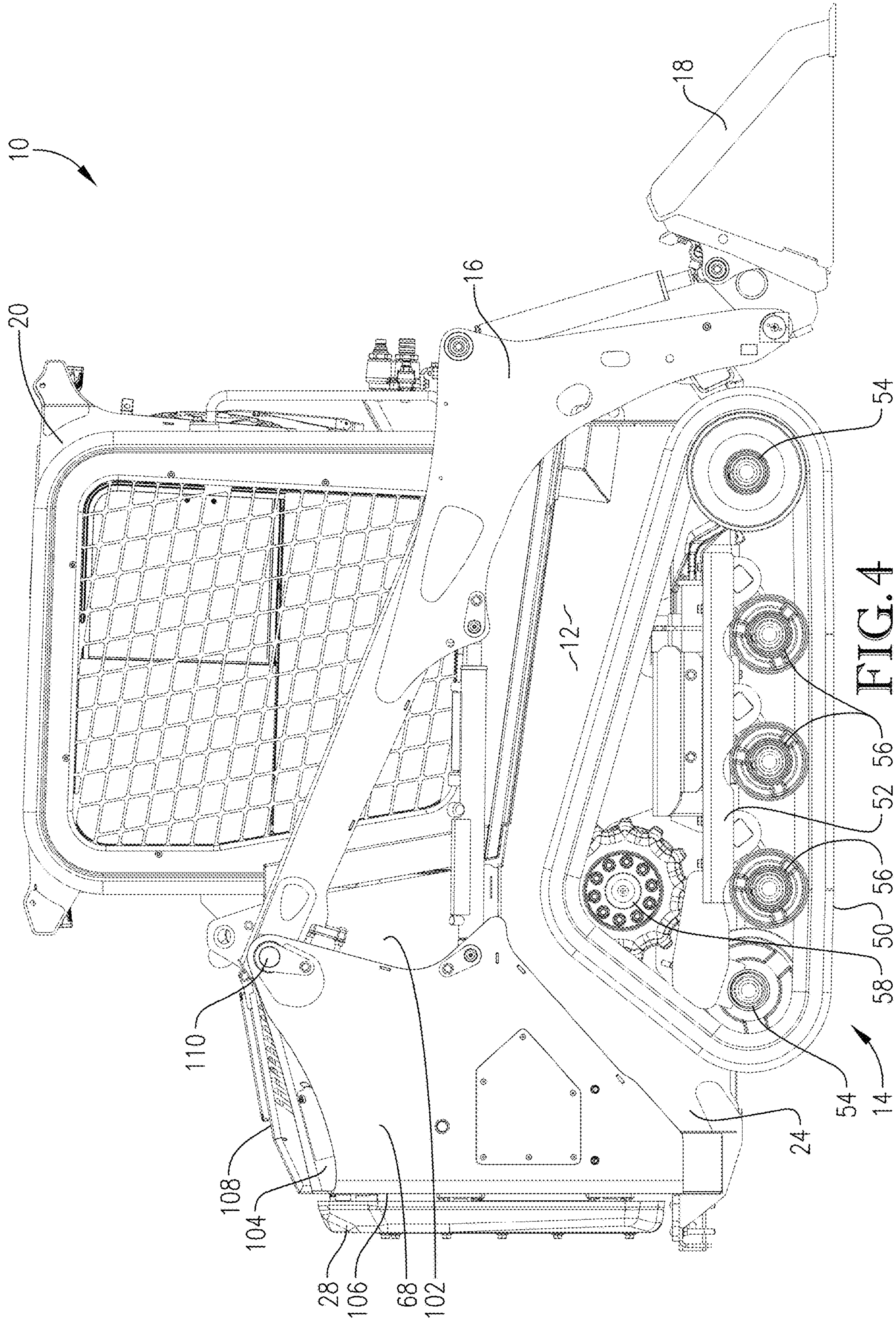
FIG. 4 is a right side elevation view of the loader from FIGS. 1-3
Figure 5:
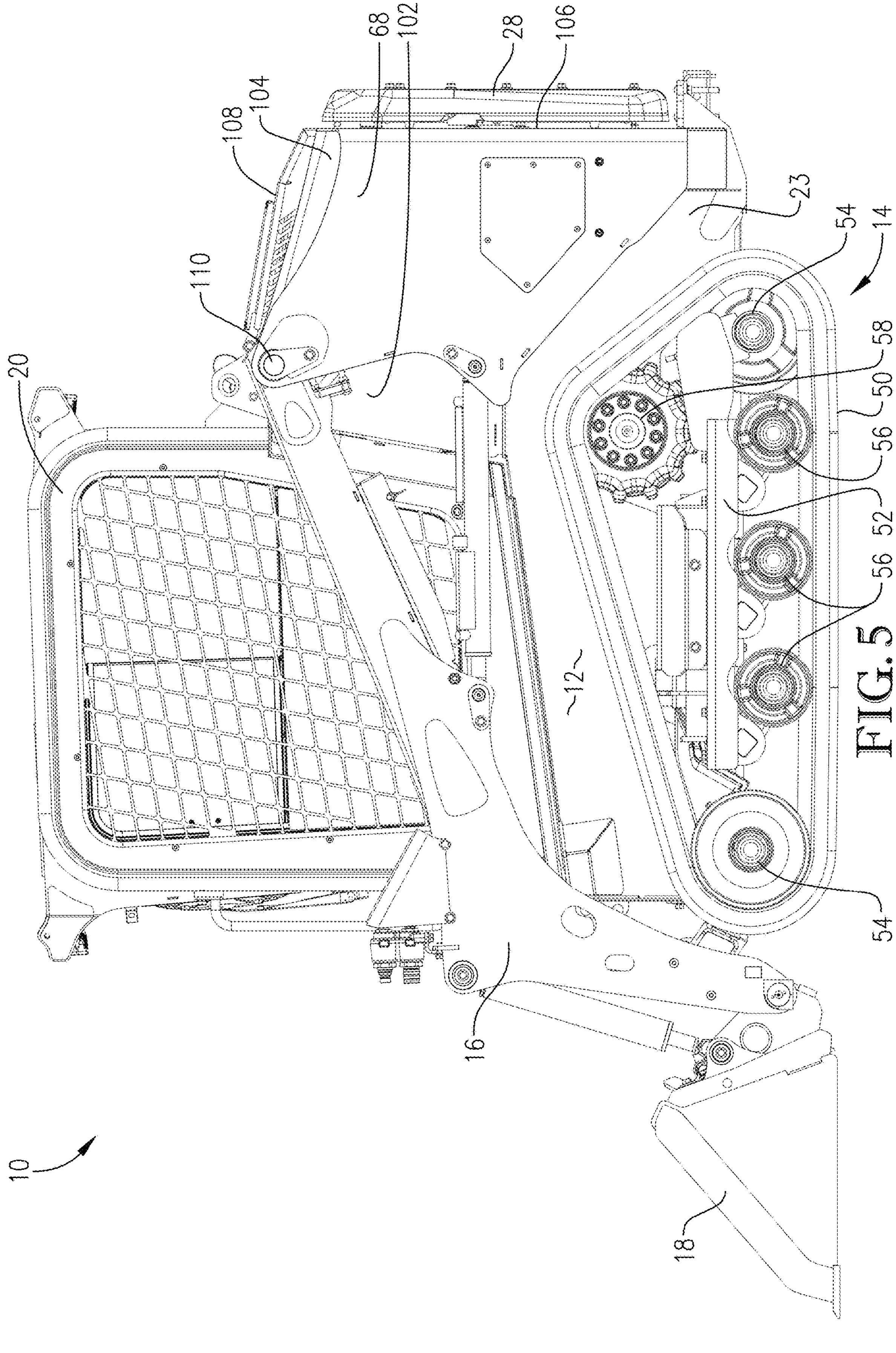
FIG. 5 is a left side elevation view of the loader from FIGS. 1-4

With reference to FIGS. 4 and 5, the drive assembly 14 of the loader may comprise a pair of endless tracks 50 that extend from the exteriors of the left side 23 and the right side 24 of the frame 12. In more detail, the drive assembly 14 may comprise a pair of track frames 52, with each track frame 52 being rigidly secured to one exterior side 23, 24 of the frame 12 of the loader 10. Specifically, the left side track frame 52 may be rigidly secured (e.g., via welding) to the left side 23 of the frame 12, so as to extend laterally away from the frame 12. Similarly, the right side track frame 52 may be rigidly secured (e.g., via welding) to the right side 24 of the frame 12, so as to extend laterally away from the frame 12. As shown in FIGS. 4 and 5, the track frames 52 may support one or more wheels rotatably secured thereto, so as to permit the tracks 50 to rotate around the track frames 52. Specifically, each track frame 52 may support a pair of idler wheels 54, with a front idler wheel 54 secured to a front of the track frame 52 and a rear idler wheel 54 secured to a rear of the track frame 52. In addition, each track frame 52 may support a plurality of roller wheels 56 (e.g., three roller wheels) secured to the track frame 52 between the idler wheels 54 in a front-to-back direction. Each of the roller wheels 56 be secured to a bottom of the track frame 52 via an independent suspension element so as to provide enhanced stability and driveability of the loader 10. In contrast, the idler wheels 54 may be directly secured to the track frames 52 via an axle.

One of the tracks 50 may loop around each of the track frames 52 and associated wheels (e.g., idler wheels 54 and roller wheels 56) so as to present a left track 50 and a right track 50. The tracks 50 may be formed from rubber, metal, or combinations thereof. Although the loader 10 is illustrated as having tracks 50, in some embodiments, the loader 10 may include one or more wheels on each side 23, 24 of the frame 12 to support and to propel the loader 10.

To facilitate rotation of the tracks 52, the drive assembly 14 may additionally comprise a pair of drive sprockets 58 positioned on either exterior side 23, 24 of the frame 12, as shown in FIGS. 4 and 5. Specifically, in some embodiments, a left side drive sprocket 58 may extend from the left side 23 of the frame 12 at a position above the left side track frame 52. Similarly, a right side drive sprocket 58 may extend from the right side 24 of the frame 12 at a position above the right side track frame 52. Each of the tracks 50 may be looped around the associated track frame 52, wheels (e.g., idler wheels 54 and roller wheels 56), and drive sprocket 58. As such, the tracks 50 may be configured in a triangular shape, when viewed from the sides of the loader 10. An interior surface of the tracks 50 may be formed with nubs that engage with teeth of the drive sprockets 58, such that rotation of the drive sprockets 58 will cause a corresponding rotation of the tracks 50. As such, the loader 10 can be propelled by rotating the drive sprockets 58, which causes rotation of the tracks 50. Specifically, the left side drive sprocket 58 may be operably connected with the left side drive motor 38, and the right side drive sprocket 58 may be operably connected with the right side drive motor 38, such that the drive motors 38 can drive the drive sprockets 58. As a result, the loader 10 can be propelled forward, rearward, and turn leftward/rightward.

Turning to the loader arms 16 of the loader 10, the loader arms 16 may comprise two loader arms 16 in the form of a left loader arm (i.e., positioned on a left side of the loader 10) and a right loader arm (i.e., positioned on a right side of the loader 10). Each of the loader arms 16 may have a rear end that is pivotably coupled with the frame 12 of the loader 10, near the back end of the loader 10. Each of the loader arms 16 may extend forward to a front end that supports a hitch assembly 60, as perhaps best shown in FIG. 2. Such hitch assembly 60 may extend at least partially between the left and right loader arms and may generally comprise one or more connection plates configurable to releasably secure various types of attachments 18 to the loader arms 16. The loader arms 16 may additionally include a cross-bar, as perhaps best shown in FIG. 1, that extends between the left and right loader arms 16. In certain embodiments, the cross-bar may be positioned adjacent to and behind the hitch assembly 60. Furthermore, in some embodiments, each of the loader arms 16 may include a tilt actuator 62, as shown in FIG. 1, that extends from the loader arm 16 to one of the lateral sides of the hitch assembly 60, so as to permit tilting of the hitch assembly 60 and any attachment 18 coupled with the hitch assembly 60. The tilt actuators 62 may comprise hydraulic cylinders (e.g., single or double-acting cylinders), pneumatic cylinders, and/or electric linear actuators. For example, if an attachment 18 in the form of a bucket is attached to the hitch assembly 60, actuation of the tilt actuators 62 will permit the bucket to be tilted such as for selectively collecting and dumping material. Finally, one or more of the loader arms 16 may include a hydraulic coupler 64, as shown in FIG. 1, with which one or more hydraulic lines may be coupled to provide hydraulic power to attachments 18 that operate on hydraulic power.

The loader arms 16 may be raised and lowered via lift actuators 66. In some embodiments, the lift actuators 66 may comprise linear actuators, such as hydraulic cylinders (e.g., single or double-acting cylinders), pneumatic cylinders, and/or or electric linear actuators. In more detail, each loader arm 16 may be associated with a lift actuator 66 that is pivotably coupled at a rearward end with one lateral side the frame 12. Each lift actuator 66 extends generally forward to a respective loader arm 16, such that a forward end of the lift actuator 66 is pivotably coupled with the loader arm 16 at a position between the rearward and forward end of the loader arm 16. In some embodiments, the frame 12 may include a cover panel 68 one each lateral side of the loader 10 that is spaced apart from the left side 23 and right side 24 of the frame 12. In certain embodiments, the cover panels 68 may cover rearward portions of the loader arms 16 and the lift actuators 66, so as to cover the connections between the loader arms 16 and the lift actuators 66 to the frame 12. In some embodiments, connection between the loader arms 16 and the lift actuators 66 to the frame 12 may also include a connection with the cover panels 68. Specifically, the rearward ends of the loader arms 16 and the lift actuators 66 may be positioned between the respective left or right sides 23, 24 of the frame 12 and the respective cover panels 68 of the frame, such that the rearward ends of the loader arms 16 and the lift actuators 66 are simultaneously rotatably coupled with both the left or right sides 23, 24 and the respective cover panels 68.

Because the rear ends of the loader arms 16 are rotatably coupled with the frame 12 at a fixed pivot point, the loader arms are configured in a "pivot-lift configuration" (also commonly referred to as a "radial lift configuration"). In such a configuration, the forward ends of the loader arms 16, and any attachment 18 coupled therewith, will generally travel in an arc-like or circular travel path. In some other embodiments (not shown in the drawings), the loader arms 16 may be configured in a "vertical-lift configuration." In such a configuration, the entirety of the loader arms 16 shift position upward, downward, forward, and/or rearward with respect to the frame 12 of the loader 10 as the loader arms 16 transition between lowered and raised positions. As such, the forward ends of vertical-lift configured loader arms 16, and any attachment 18 coupled therewith, can travel along a substantially vertical travel path.

Figure 2:
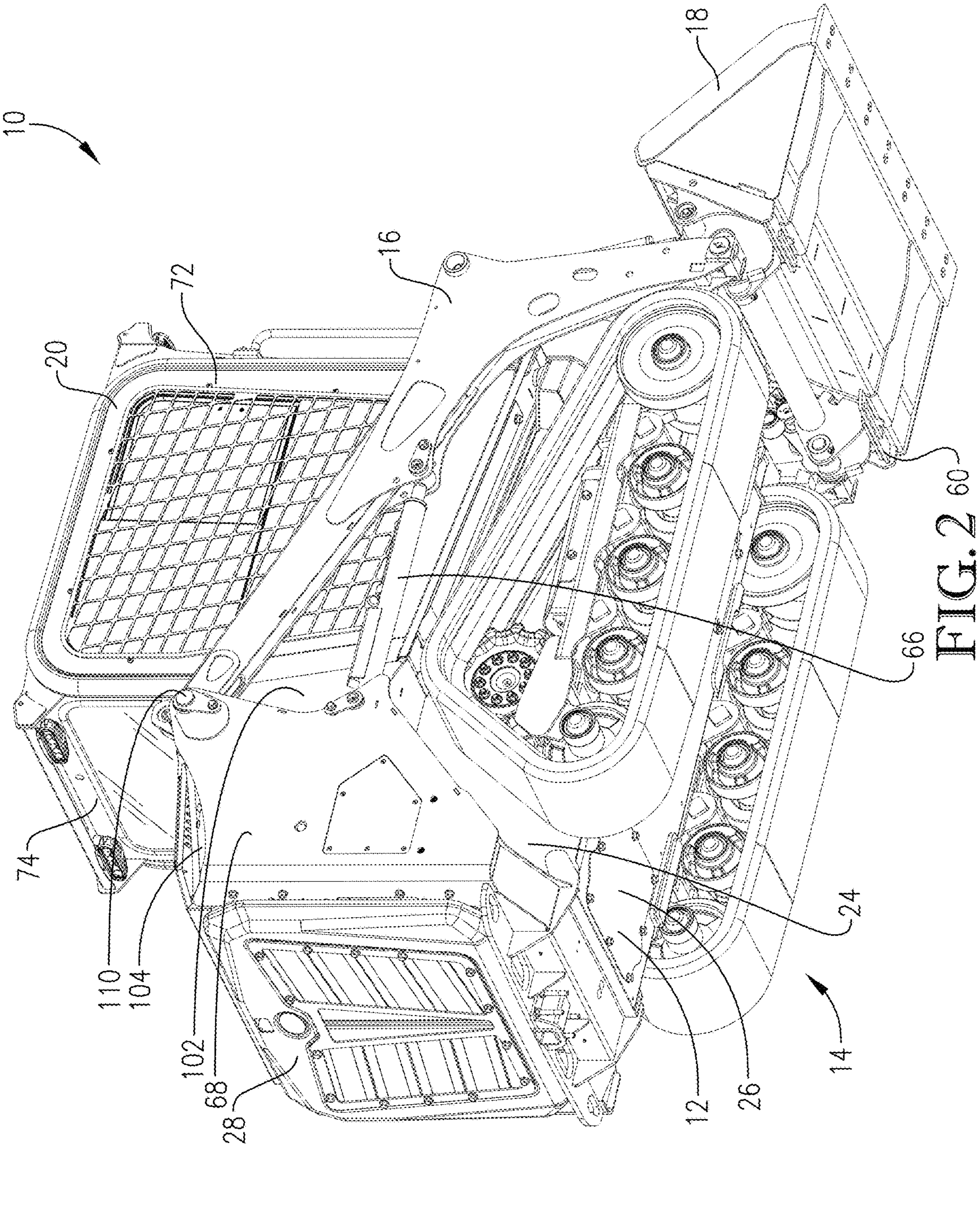
FIG. 2 is a rear perspective view of the loader from FIG. 1.
Figure 3:
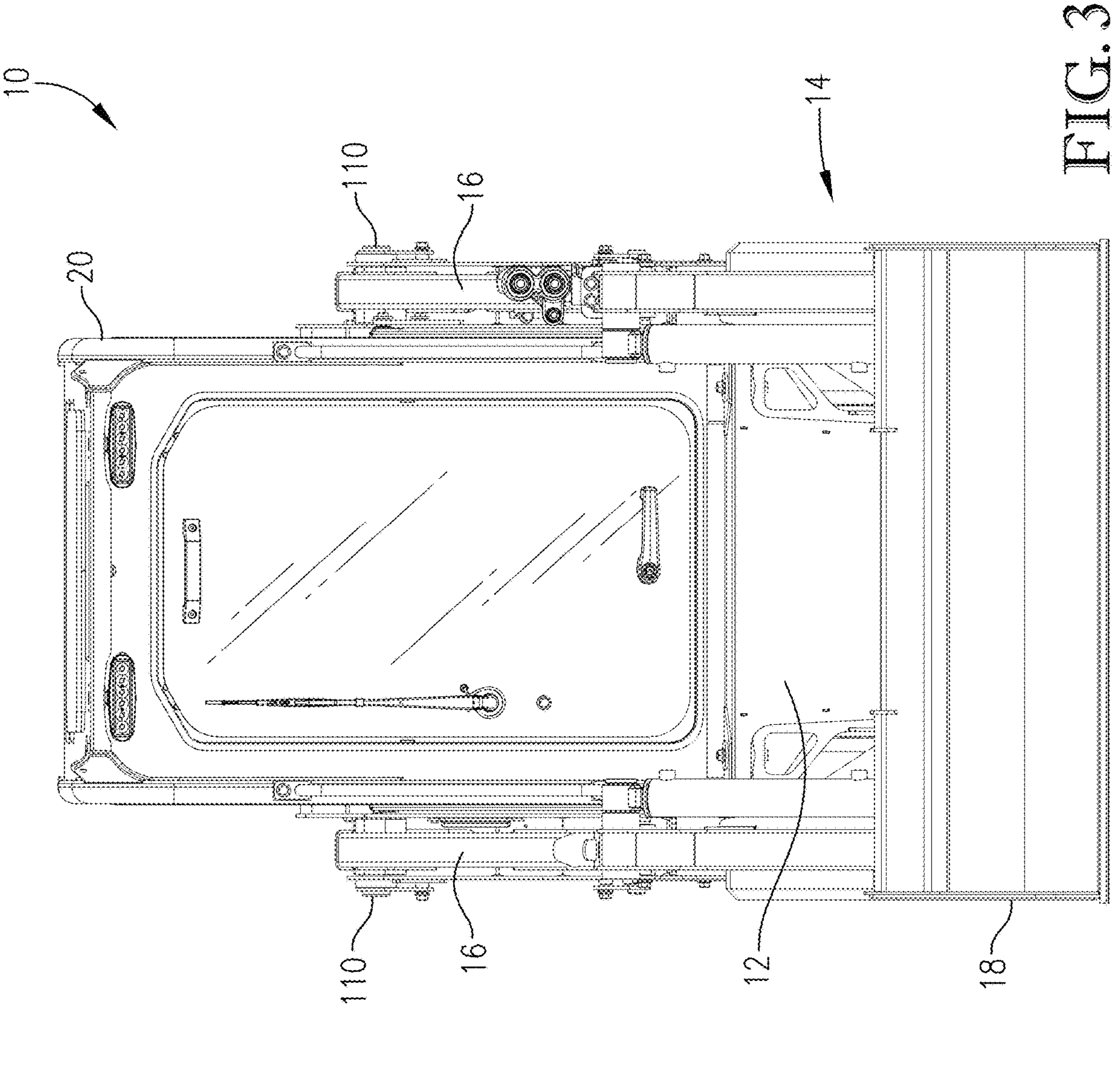
FIG. 3 is a front elevation view of the loader from FIGS. 1 and 2.

As noted previously, the cab 20 of the loader 10 may be rotatably coupled with the frame 12, as illustrated in FIG. 10, such that the cab 20 can be selectively positioned in a closed, operating position and in an open, raised position. The cab 20 may, as shown in FIGS. 1, 2, and/or 11, have a generally rectangular shape with a left side 71, a right side 72, a front side 73, a back side 74, a top side 75, and a bottom side 76. The sides 71-76 of the cab 20 may enclose an interior space within which an operator can be positioned to operate the loader, as will be disclosed in more detail below. Each of the left side 71, the right side 72, and the back side 74 may comprise a frame bordering a transparent material (e.g., plastic or glass) configured to operate as a window, such that an operator of the loader 10 can view the eternal environment. In certain embodiments, the back side 74 may comprise a lower portion and an upper portion. The upper portion may comprise the transparent material, while the lower portion may comprise a generally solid, sheet of material (e.g., steel). However, the lower portion may include one or more openings or ports configured to facilitate airflow into and out of the cab 20 from the HVAC system 44. In some embodiments, the top side 75 may also include one or more windows so as to permit light to enter the interior space of the cab 20.

Figure 14A:
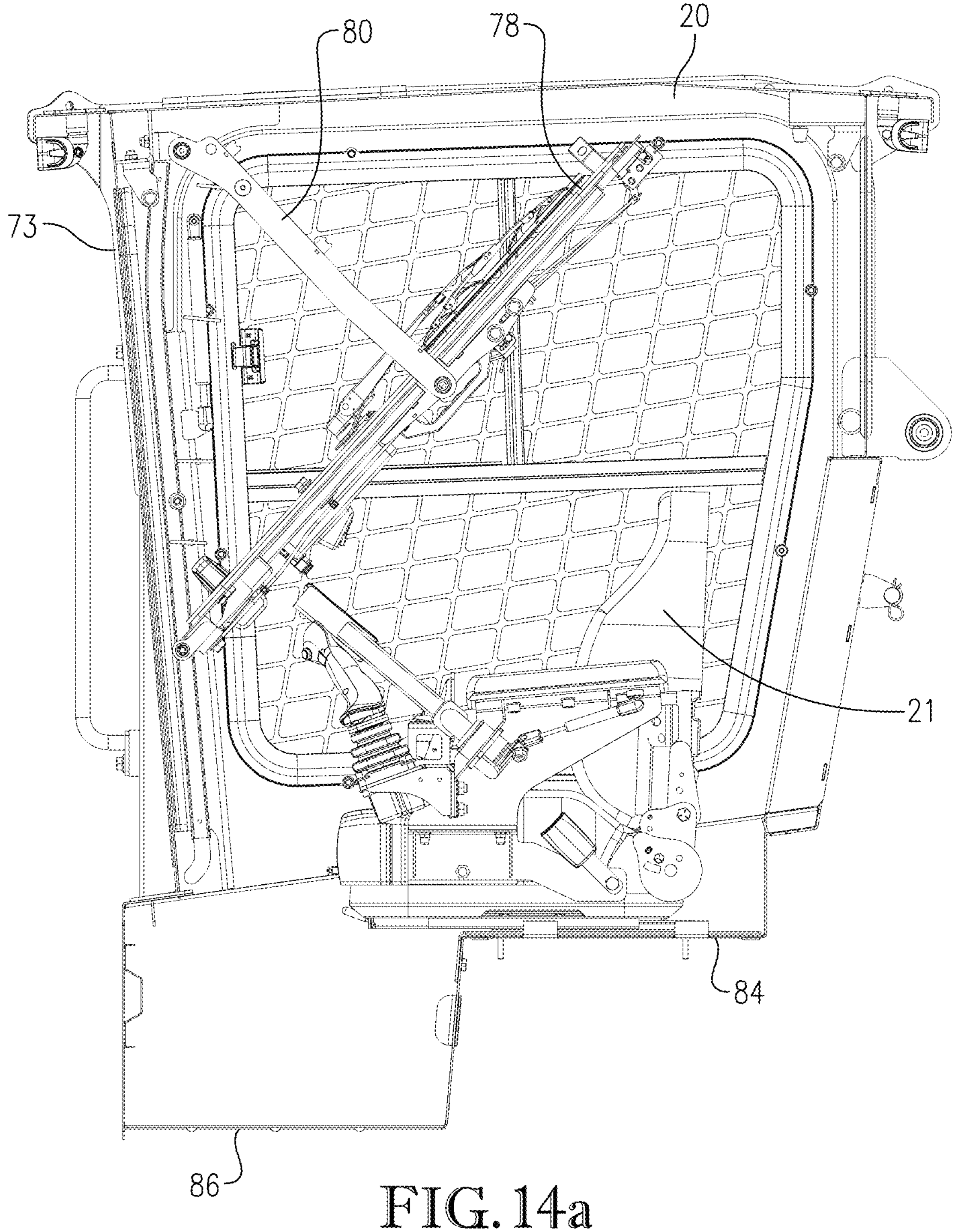
FIG. 14*a* is a left side elevation view of an interior space of a cab of the loader from FIGS. 1-8, with a portion of the cab removed to illustrate a main door in an intermediate position between a closed position and an opened position.
Figure 14B:
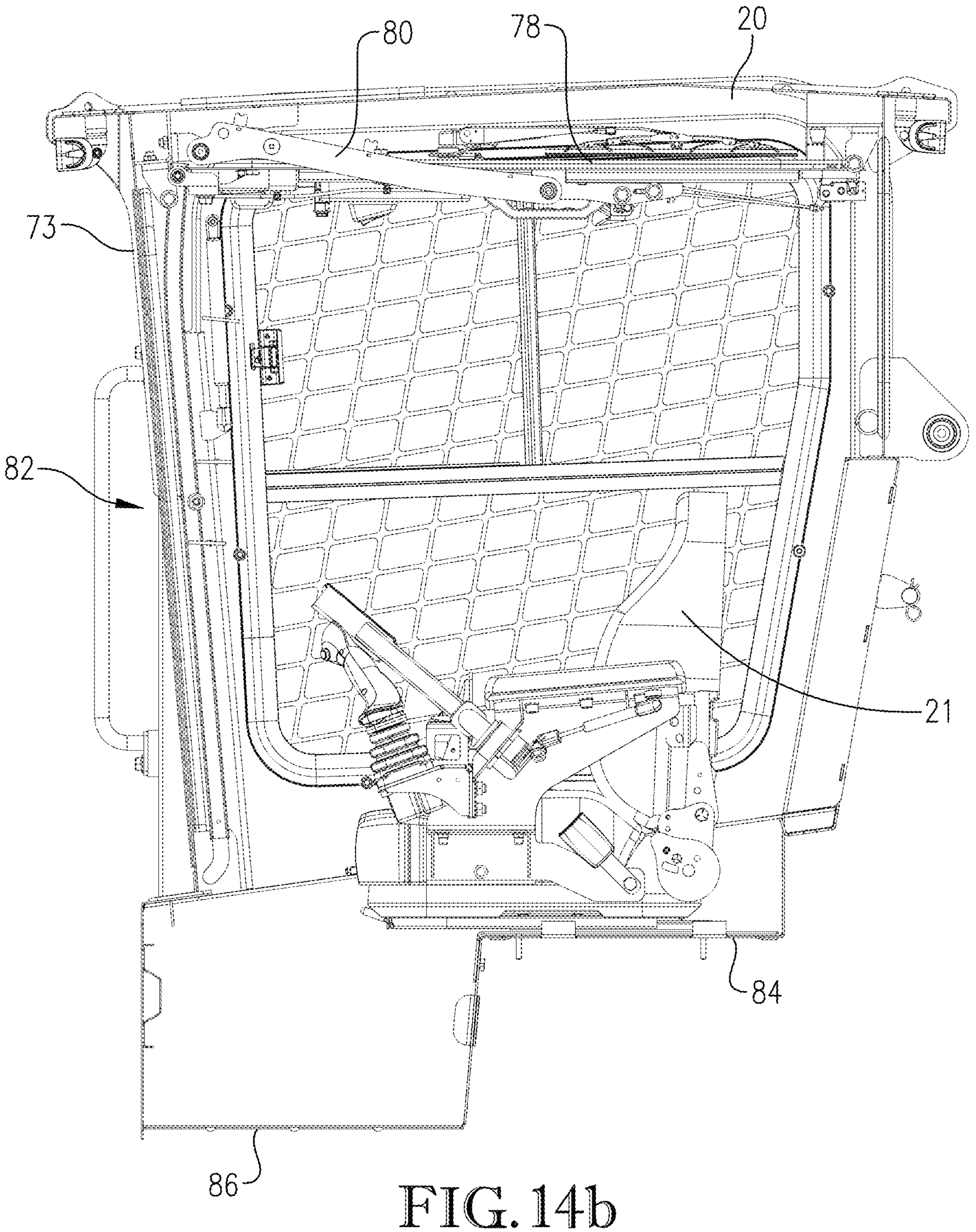
FIG. 14*b* is a left side elevation view of the interior space of the cab from FIG. 14*b*, with the main door the opened position.

The front side 73 of the cab 20 may comprise a frame that borders a main door 78. As shown in FIGS. 14*a* and 14*b*, the main door 78 may be attached to other components of the cab 20 via an actuation assembly 80 configured to permit the main door 78 to selectively transition back and forth between an opened position (e.g., FIG. 14*b*) and a closed position (e.g., FIG. 1). It is noted that FIG. 14*a* illustrates the main door in a transition state between the opened position and the closed position. The main door 78 may comprise a transparent material (e.g., plastic or glass) configured to operate as a window. With the main door 78 in a closed position (i.e., positioned generally parallel with and adjacent to the frame of the front side 73 as shown in FIG. 1), the door 78 acts as a window, such that the operator can view forward so as to observe the environment, the loader arms 16, the attachment 18, etc. of the loader 10. When the main door 78 in an open position, as shown in FIG. 14*b* (i.e., positioned generally parallel with and adjacent to the top side 75), the main door 78 is actuated away from the front side 73 of the cab so as to present an open entryway 82 through which an operator can enter and exit the interior space of the cab 20.

With reference to FIG. 11, the bottom side 76 of the cab 20 may comprise a main platform 84 on which the seat 21 is positioned within the interior space of the cab 20. The bottom side 76 may additionally comprise a lowered platform 86 positioned forward of the main platform 84, and is configured to receive the feet of the operator of the loader 10 when the operator is seated on the seat 21 to operate the loader 10.

Figure 15A:
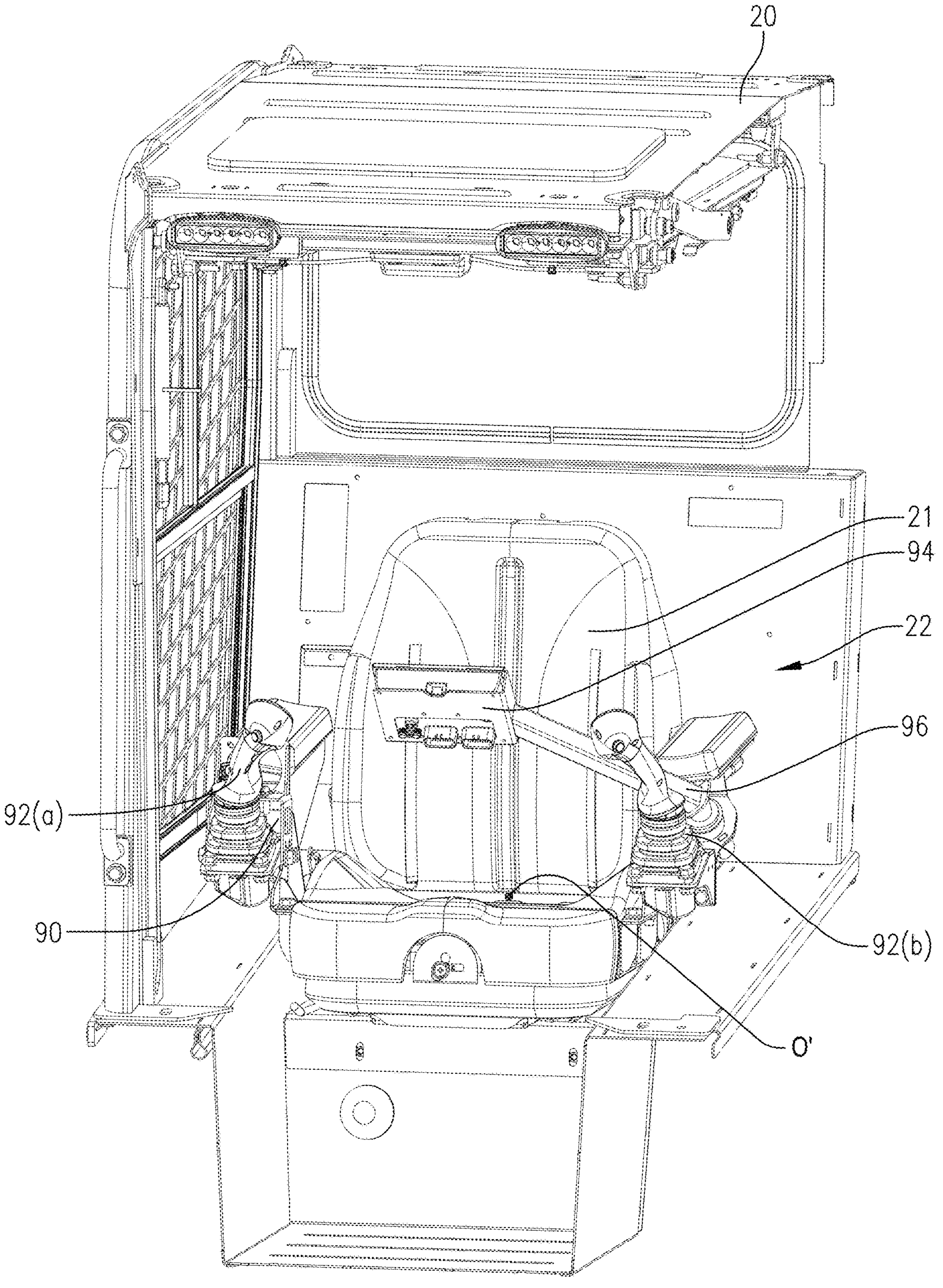
FIG. 15*a* is a front perspective view of a cab of the loader from FIGS. 1-8, with a portion of the cab cut away to illustrate user controls of the loader, and with a graphic display and lap bar in a lowered, operating position.
Figure 15B:
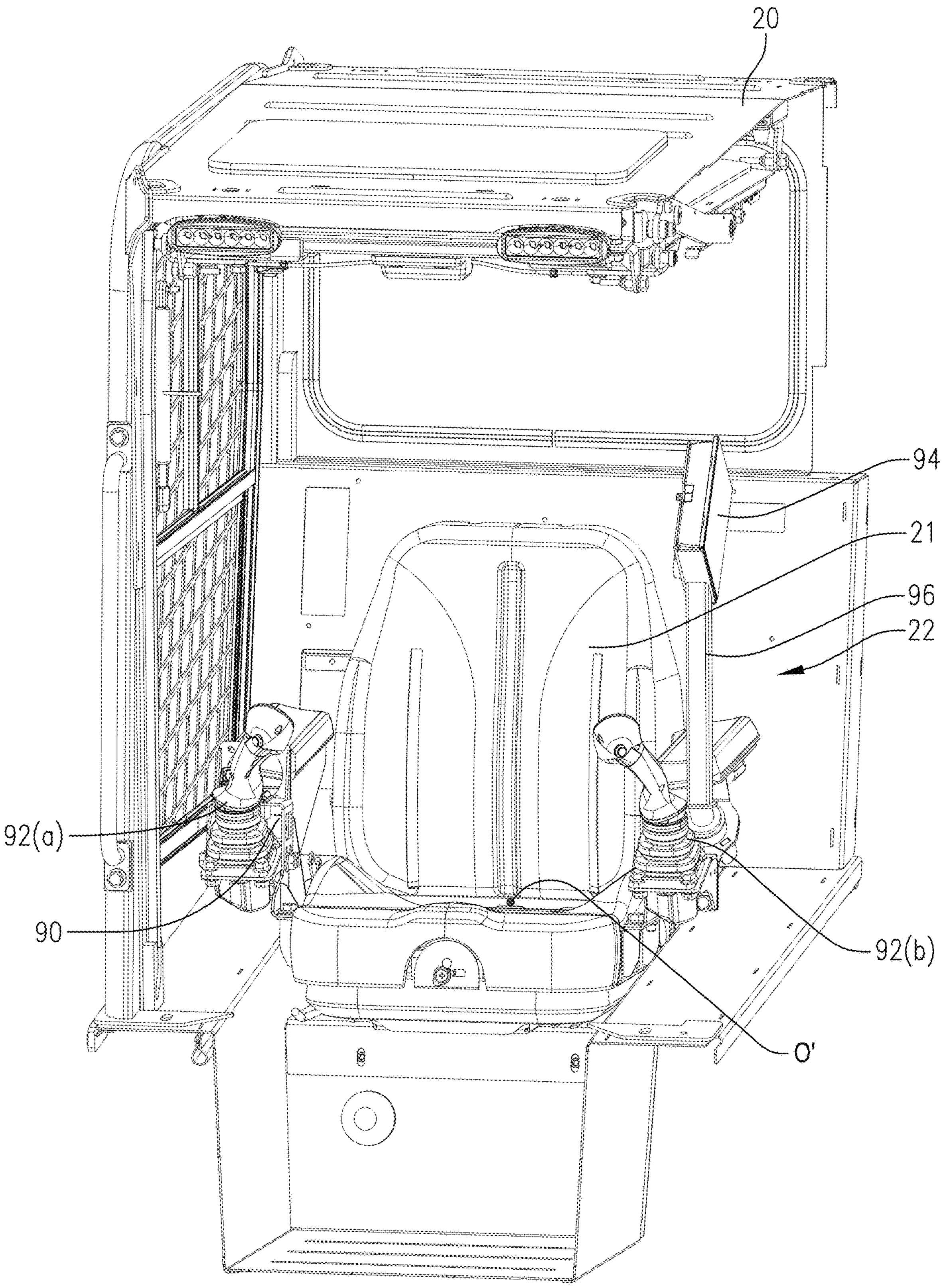
FIG. 15*b* is a front perspective view of the cab from FIG. 15*a*, with the graphic display and lap bar in a raised, non-operating position.

Turning to FIGS. 15*a* and 15*b*, the interior space of the cab 20 includes a plurality of user controls 22 (e.g., buttons, switches, levers, joysticks, touchscreen displays, etc.) that the operator can access and manipulate when the operator is seated on the seat 21. As such, the interior space of the cab 20 may be referred to as a control station. In more detail, the seat 21 may include a pair of armrests on which a user may rest his/her arms when seated in the seat 21 and operating the loader 10. A control panel 90 with one or more user controls 22, in the form of buttons, switches, or levers, may be positioned forward of one of the armrests. The operator may select such user controls 22 on the control panel 90 to perform various functions of the loader, such as (i) providing electrical power from the battery to various components of the loader, (ii) turning on/off vehicle lights of the loader, which may be positioned on exterior portions of the cab 20, (iii) starting the engine 30 of the loader 10.

In addition, a pair of joysticks 92 may be positioned forward of the armrests such that an operator can comfortably reach the joysticks 92 when seated in the seat 21. A first of the joysticks 92 may be a loader arm & attachment ("LA&A") joystick 92(*a*) for controlling actuation of the loader arms 16 (e.g., raising and lowering) and various hydraulically-operated functions of the attachment 18 that may be supported on the front of the loader arms 16. For example, the hydraulically-operated functions may include a tilt function for buckets or auxiliary hydraulic functions for other hydraulically-operated attachments 18 such as, e.g., bit rotation of a drill, bit actuation of a jack-hammer, rotation of a blade for a saw, rotation of multiple blades for a rotary cutter, brush rotation of a sweeper, etc. In addition, a second of the joysticks 92 may include a drive joystick 92(*b*), which is configured to control actuation of the tracks 50 (e.g., via control the drive motors 38 and the sprockets 58) for controlling overall movement (e.g., travel direction and speed) of the loader 10. In more detail, the drive joystick 92(*b*) may extend upward in front of the armrests, such that an operator may grasp and shift the drive joystick 92(*b*) so as to cause a corresponding movement of the loader 10. In certain embodiments, the loader 10 may include an electric-over-hydraulic ("EOH") system, such that the joysticks 92 may generate electric signals, which are configured to control hydraulic components of the loader 10.

In addition, the user controls 22 may include a graphic display 94 comprising an electronic display, such as a cathode ray tube, liquid crystal display, plasma, or touch screen that is operable to display visual graphics, images, text, etc. In embodiments in which the graphic display 94 is a touchscreen, the operator can manipulate the graphic display 94 to control various aspects and/or functionalities of the loader 10. The graphic display 94 may include, or may otherwise be associated with, one or more memory elements and processing elements. The memory elements may comprise non-transitory computer readable media and/or firmware, with a computer program stored thereon. The processing elements may comprise processors, CPUs, FPGAs, etc., which are configured to execute computer programs stored on the memory elements to perform various functions and features of the loader 10. It should be understood that certain of the loader's 10 functions and features discussed above and below may be performed by execution of the computer program by the processing elements. For example, the graphic display 94 may be configured to (by the processing elements executing the computer program stored on the memory elements) (i) obtain information from various components of the loader 10 (e.g., via sensors, actuators, timers, clocks, etc.) so as to present such information to the operator via the graphic display 94, and (ii) receive instructions from the operator (e.g., via the graphic display 94 or other of the control elements 24) to control various operations of the loader 10. For example, the graphic display 94 may present various graphical user interfaces (GUIs) that provides information to the operator and/or that facilitate interaction and control of the loader 10 by the operator. In embodiments in which the graphic display 94 is a touchscreen, the GUIs enable the operator to interact with the loader 10 by touching or pointing at display areas of the GUI. In some other embodiments, the operator will interact with the GUIs and/or the loader by manipulating interactable graphical icons/elements that are associated with the graphic display 94. The functionality of the graphic display 94 will be described in more detail below.

As illustrated in FIGS. 15*a* and 15*b*, the graphic display 94 may be coupled to an end of a rotatable lap bar 96. As such, the graphic display 94 and the lap bar 96 may be selectively shiftable between a raised, non-operable position (i.e., FIG. 15*b*) to and a lowered, operating position (i.e., FIG. 15*a*). In the raised, non-operable position, the graphic display 94 and the lap bar 96 are rotated away from the seat 21 such that space is provided for the operator to access or disembark from the seat 21. Once the operator has sat down in the seat 21, the graphic display 94 and the lap bar 96 can be rotated down towards the seat, such that the graphic display 94 is positioned in the lap area of the operator. As such, the operator can easily interact with the graphic display 94 to obtain information for and/or control functions of the loader 10. In some embodiments, the loader 10 may include a position sensor associated with the lap bar 96 and configured to determine if the lap bar 96 is in either the raised, non-operable position or the lowered, operating position. In some embodiments, certain functions of the loader 10 may not be operable unless the lap bar 96 is in the lowered, operating position. In addition, some embodiments may provide for the seat 21 to include a presence sensor configured to determine whether an operator is seated in the seat 21. In some embodiments, certain functions of the loader 10 may not be operable unless the operator is seated. The above-described position/presence sensors may comprise electronic sensors, such an inductive proximity switch configured to be triggered by the position of the lap bar and/or weight of the operator present in the seat 21. Thus, the loader 10 is configured to determine whether or not an operator is positioned within the seat 21 and with the lap bar 96 in the lowered, operating position. In some embodiments, certain operational features of the loader 10 may be restricted (e.g., starting the engine 30 of the loader, maneuvering the loader 10, actuating the loader arms 16 and/or attachment 18, etc.) if an operator is not present in the seat 21 and/or the lap bar 96 is not positioned in the lowered, operating position.

Work Machine Frame

Figure 6:
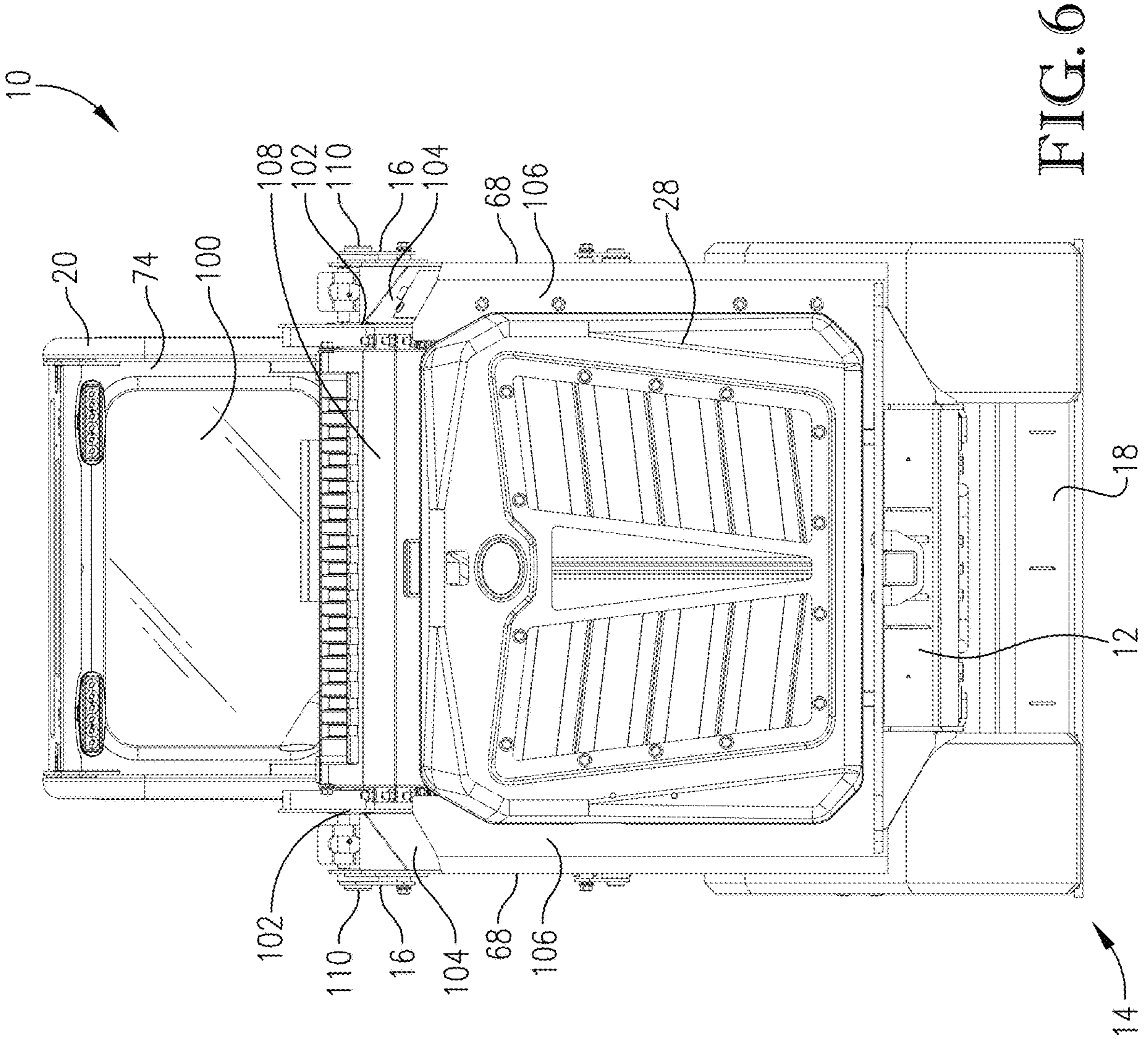
FIG. 6 is a rear elevation view of the loader from FIGS. 1-5.
Figure 7:
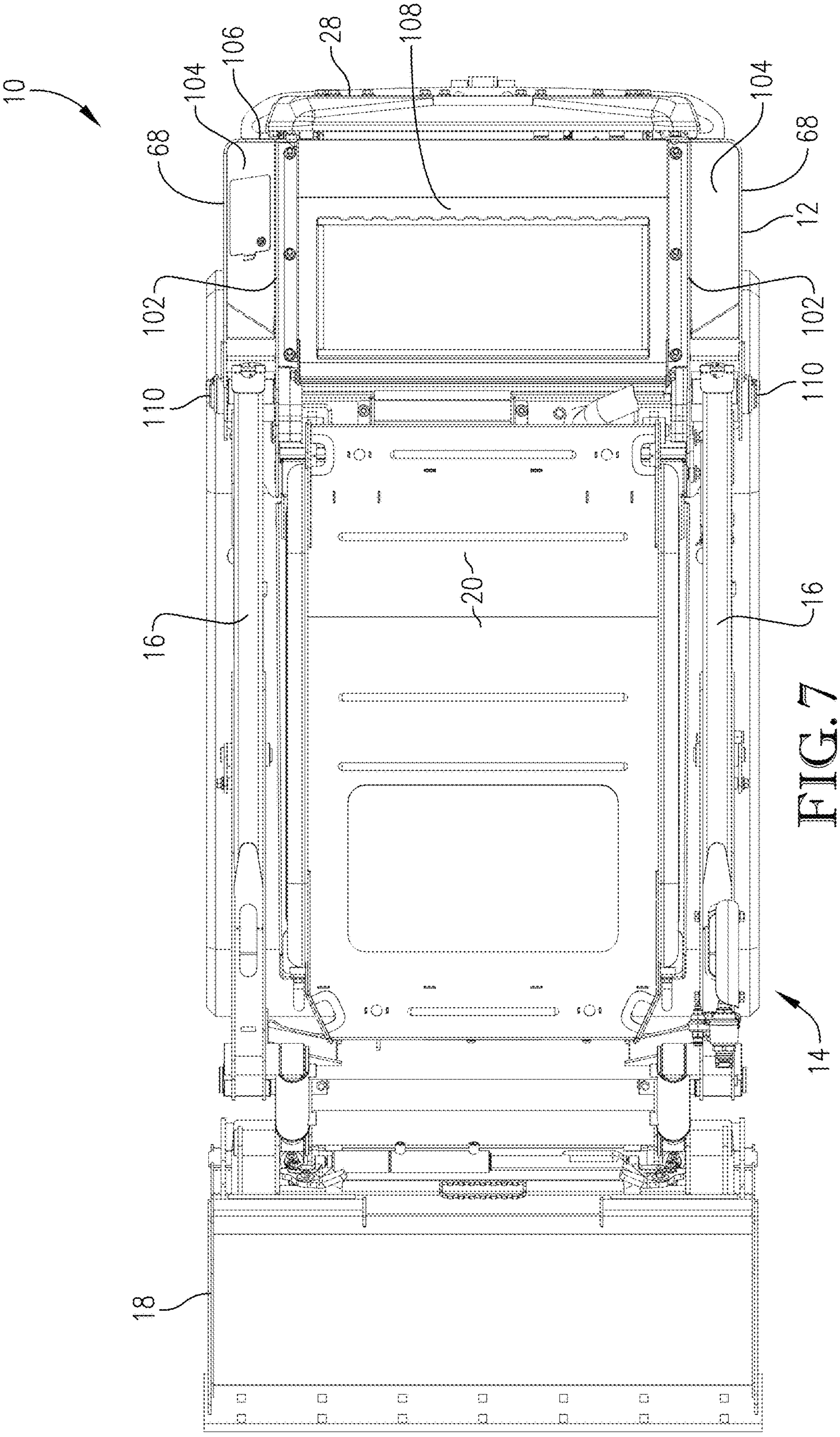
FIG. 7 is a top plan view of the loader from FIGS. 1-6.
Figure 8:
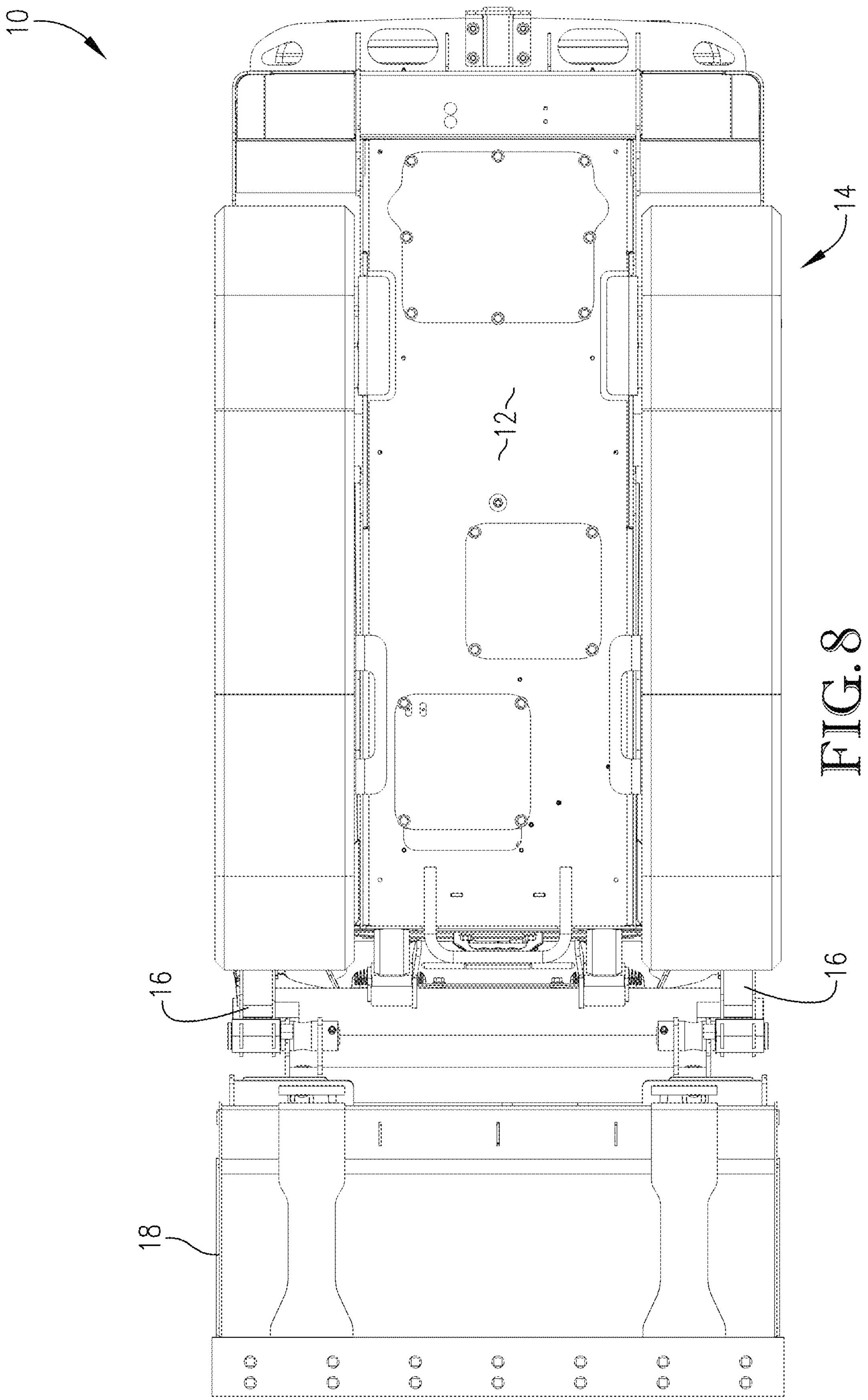
FIG. 8 is a bottom plan view of the loader from FIGS. 1-7.

The frame 12 of the work machine 10 may be particularly configured to provide beneficial viewing angles and/or lines of sight to an operator during operation of the work machine 10. In more detail, as illustrated in FIG. 6, the back side 74 of the cab 20 may include a rear window 100 formed from glass, plastic, or other transparent material. In general, the operator will be positioned inside the cab 20 when operating the work machine 10. Thus, to view the environment around the back side of the work machine 10, the operator can turn his/her head rearward to view the environment through the rear window 100. In some prior art work machines, the size and shape of the work machine's frame would interfere with the operator's line of sight, particularly for portions of the environment near the work machine. Beneficially, the work machine 10 of embodiments of the present invention includes a frame 12 configured to enhance the viewing angles and/or lines of sight of the operator.

In more detail, as was previously described, the frame 12 of the work machine 10 includes a left side 23 and a right side 24, which are spaced apart from each other (see, e.g., FIGS. 1 and 2). The rear portion 12(*b*) of each of the left side 23 and the right side 24 of the frame 12 includes a cover panel 68. Such cover panels 68 may be positioned outward from the main portions of the frame 12, which are referred to herein as inner panels 102. The inner panels 102 and the cover panels 68 of each of the left side 23 and the right side 24 of the rear portion 12(*b*) of the frame 12 are illustrated in FIGS. 1, 2, 4, and 5. Notably, to provide the enhanced viewing angles and/or lines of sight, at least a portion of a top edge of the cover panel 68 on each of the left and right side 23, 24 of the frame 12 is positioned vertically lower than a top edge of the corresponding inner panel 102.

Although the cover panels 68 are positioned outwardly from the inner panels 102, the cover and inner panels 68, 102 may be connected via connecting panels that provide for the space between the cover and inner panels 68, 102 to be enclosed. For example, as shown in FIG. 6, top connecting panels 104 extend between upper regions of the inner panels 102 and upper regions of the cover panels 68. Similarly, back connecting panels 106 extend between rearward regions of the inner panels 102 and rearward regions of the cover panels 68. Regardless, the cover panels 68 may comprise the exterior-most portions of the frame 12 (with respect to a lateral direction).

As perhaps best shown in FIG. 6, the access door 28 at the rear of the work machine 10 extends from the left side, back connecting panel 106 to the right side, back connecting panel 106. In addition, a top main panel 108 of the rearward portion 12(*b*) of the frame 12 may extend from the back side 74 of the cab 20 to a top portion of the access door 28. Such top main panel 108 may also extend laterally from the left side, inner panel 102 to the right side, inner panel 102. The top main panel 108 may simply comprise a single panel of material, or may comprise one or more doors, hatches, air/exhaust vents, or the like. Regardless, the top main panel 108 may extend downward, generally linearly, from the back side 74 of the cab 20. Such downward extension may be between 5 and 30 degrees, between 10 and 25 degrees, and/or between 15 and 20 degrees.

As was described previously, the loader arms 16 may be attached to the frame 12 of the work machine 10 at a connection point rearward of the cab 20. In more detail, the left side loader arm 16 may be connected to the left side 23 of the frame 12 via a connection between the inner panel 102 and the cover panel 68. Such a connection is a pivot connection illustrated in FIGS. 1, 3, and 5-7 by reference number 110. Similarly, the right side loader arm 16 may be connected to the right side 24 of the frame 12 via a connection between the inner panel 102 and the cover panel 68. Such a connection is a pivot connection illustrated in FIGS. 2, 3, 4, 6, and 7 also by reference number 110. Thus, the rear ends of the loader arms 16 are positioned between and attached to the inner and cover panels 102, 68 on each of the left and right sides 23, 24 of the frame 12.

Figure 16:
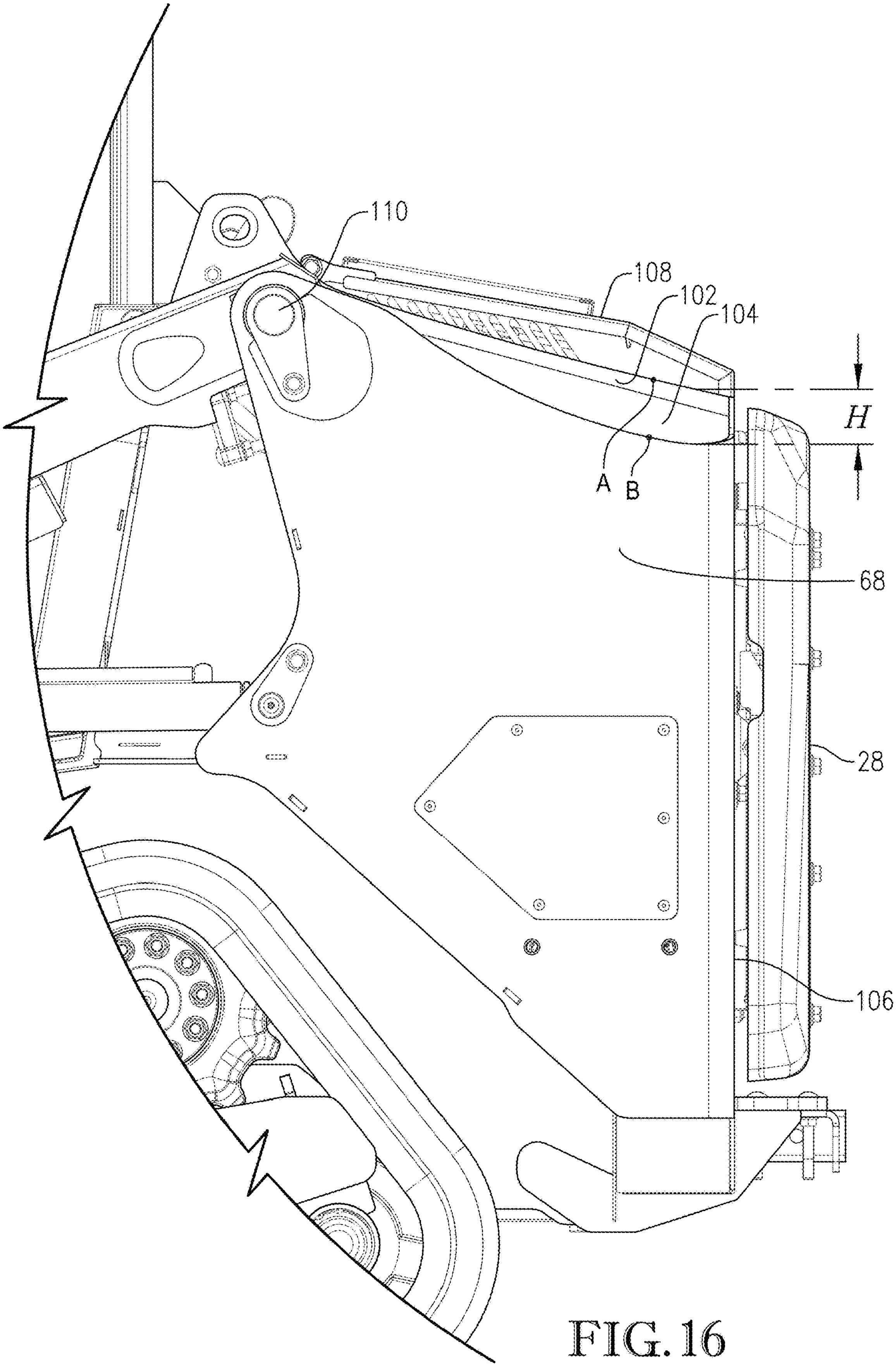
FIG. 16 is a side elevation view of a left rear portion of the loader from FIGS. 1-8, with the portion of the loader enlarged to illustrate inner and cover panels of a frame of the loader.

In view of the above, and with reference to FIG. 16, the inner and cover panels 102, 68 of each of the left and right sides 23, 24 of the frame 12 extend rearward from the pivot connections 110 to the back connecting panels 106 of the frame. Correspondingly, the top edges of both the inner and cover panels 102, 68 extend rearward and downward from the pivot connections 110 to the back connecting panels 106. In more detail, the top edges of the inner panels 102 may extend downward (from front to back) generally linearly at the same approximate angle as the top main panel 108 (e.g., between 5 and 30 degrees, between 10 and 25 degrees, and/or between 15 and 20 degrees). Because at least a portion of the top edges of the cover panels 68 are positioned vertically lower than the top edges of the inner panels 102, the top edges of the cover panels 68 will extend downward at a greater rate than the rate at which the top edges of the inner panels 102 extend downward (i.e., greater than linearly).

In more detail, as shown in FIG. 16, the top edges of the inner panels 102 and the cover panels 68 start at approximately the same vertical height adjacent to the pivot connections 110 (which rotatably connects the loader arms 16 with the frame 12). It should be understood that although FIG. 16 shows the left side of the loader 10, the frame 12 (including the inner and cover panels 102, 68) is configured the same on the right side of the loader 10. Moving rearward from the area adjacent to the pivot connections 110, the top edges of the inner panels 102 decline generally linearly, while the top edges of the cover panels 68 decline at a faster rate. As a result, at least a portion of the top edge of the cover panel 68 is positioned vertically lower than a top edge of the inner panel 102. For instance, as illustrated in FIG. 16, at least the rearward three-quarters, the rearward half, and/or the rearward one-quarter of the top edge of the cover panel 68 is positioned vertically lower than a top edge of the inner panel 102. In some embodiments, the top edge of the cover panel 68 is positioned vertically lower than the top edge of the inner panel 102, such that a vertical distance "H" is present between such top edges (see FIG. 16). Such distance "H" may be a maximum distance by which the top edge of the cover panel 68 is positioned vertically lower than the top edge of the inner panel 102 (as measured about a vertical line extending through both the inner panel 102 and the cover panel 68). In some embodiments, the distance "H" may be at least 1.0 inch, at least 1.5 inches, at least 2 inches, at least 2.5 inches, at least 3.0 inches, at least 4 inches, and/or about 2.5 inches.

Because the top edge of the cover panel 68 is positioned vertically lower than the top edge of the inner panel 102, the top connecting panel 104 that connects the upper portions of the inner panel 102 and the cover panel 68 may be required to extend from the inner panel 102 at a declining angle (in a lateral direction, extending outward), to the cover panel 68. Similarly, because the rearward portions of the top edge of the cover panel 68 is positioned vertically lower than the rearward portions of the top edge of the inner panel 102, the top edge of the back connecting panel 106 may be required to extend from the inner panel 102 at a declining angle (in a lateral direction, extending outward), to the cover panel 68.

In view of the above description of the frame 12, and particularly of the configuration of the inner panel 102 and the cover panel 68 of the rearward portion 12(*b*) of the frame 12, the work machine 10 provides enhance viewing angles and/or line of sight for an operator of the work machine 10. In more detail, and with reference to FIG. 17, a line of sight "X" originating at a center of the rear window 100 and extending downward tangent to a point "A" on the top edge of the inner panel 102 will continue downward to the ground surface (on which the work machine 10 is positioned) without passing through any portion of the cover panel 68. In some embodiments, the point "A" will be positioned rearward of the pivot connection 110. For instance, as shown in FIG. 16, the point "A" may be located on the top edge of the inner panel 102 within the rearward three-quarters, the rearward half, and/or the rearward one-quarter of the top edge of the inner panel 102.

As such, the operator of the work machine 10 can have a preferential views of the environment around the work machine. Such views are preferential because of the top edge of the cover panel 68 being positioned vertically lower than the top edge of the inner panel 102. Specifically, a top edge of the cover panel 68 at a point B, which lies on a vertical plane along with the point "A" from the top edge of the inner panel 102, is positioned vertically lower than a top edge of the inner panel 102 at a point A (see, e.g., FIGS. 16 and 17). Thus, the line of sight "X" can pass tangentially by point A, downwards and into the ground surface, without contacting any portion of the cover panel 68 (including point B of the top edge of the of the cover panel 68). It should be understood that because the inner and cover panels 102, 68 of the frame 12 are similarly constructed on each of the left and right sides of the loader 10, a similar line of sight "X" may be provided on the right side of the loader 10 (similar to the line of sight "X" shown on the left side of the loader 10 on FIG. 17).

Figure 17:
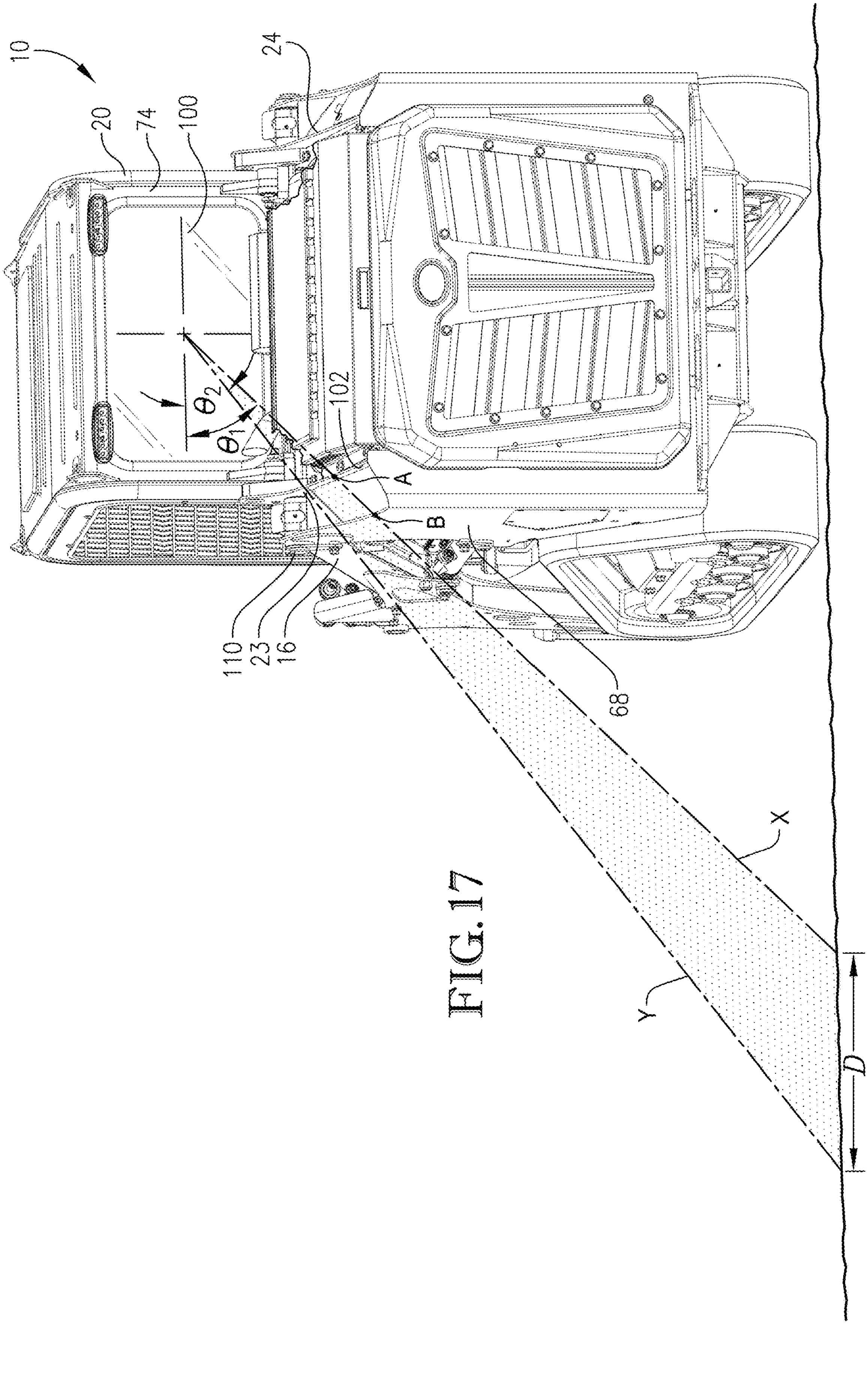
FIG. 17 is a rear perspective view of the loader from FIGS. 1-8, particularly illustrating the loader positioned on a ground surface and a frame of the loader providing enhanced viewing angles to an operator of the loader.

As illustrated, the line of sight "X" may make an angle $\theta_1$ of at least 33 degrees, at least 35 degrees, at least 37 degrees, and/or at least 40 degrees below horizontal. If the top edge of the cover panel 68 was at the same height as the top edge of the inner panel 102, then the line of sight "X" would pass through the cover panel 68, meaning that the operator would not be able to view the line of sight "X" entirely to the ground surface. Instead, if the top edge of the cover panel 68 was at the same height as the top edge of the inner panel 102, the operator would only be able to view a line of sight "Y" (see FIG. 17) that extends from the center of the window 100, across the top edge of the cover panel 68, and to the ground surface. Such line of sight "Y" may make an angle $\theta_2$ of no more than 30 degrees below horizontal. Such an angular difference between the line of sights "X" and "Y" corresponds to a linear difference "D" on the ground surface of from 1 to 5 feet, from 2 to 4 feet, and/or about 2.5 feet. Thus, embodiments of the present invention, such as the configuration of the rearward portion 12(*b*) of the frame 12 (e.g., the inner panel 102 and the cover panel 68), provide for operators of the inventive work machine 10 to be able to observe more of the environmental area around the work machine 10. Specifically, as illustrated in FIG. 17, the operator of the loader 10 can view portions of the ground surface that is from 1 to 5 feet closer to the loader 10 than if the loader 10 had a cover panel 68 with a top edge that was at the same vertical height as the top edge of the inner panel 102.

The improved viewing angles and/or lines of sight provided by the loader 10 are also made possible by the position of the connections between the loader arms 16 and the frame 12 of the loader 10. Specifically, as illustrated in the figures, the pivot connections 110 of the loader 10 of the present invention are positioned relatively close to the rear of the cab 20. As such, the pivot connections 110 of the loader 10 are positioned relatively close to the seat 21 positioned within the cab 20). In contrast, many prior art loaders include connections between their loader arms and their frames which are positioned well behind and/or vertically above the loaders' cabs and/or the seats within the cabs. For example, many prior art loaders include connections between their loader arms and their frames that are positioned near the back ends of the loaders.

Figure 18:
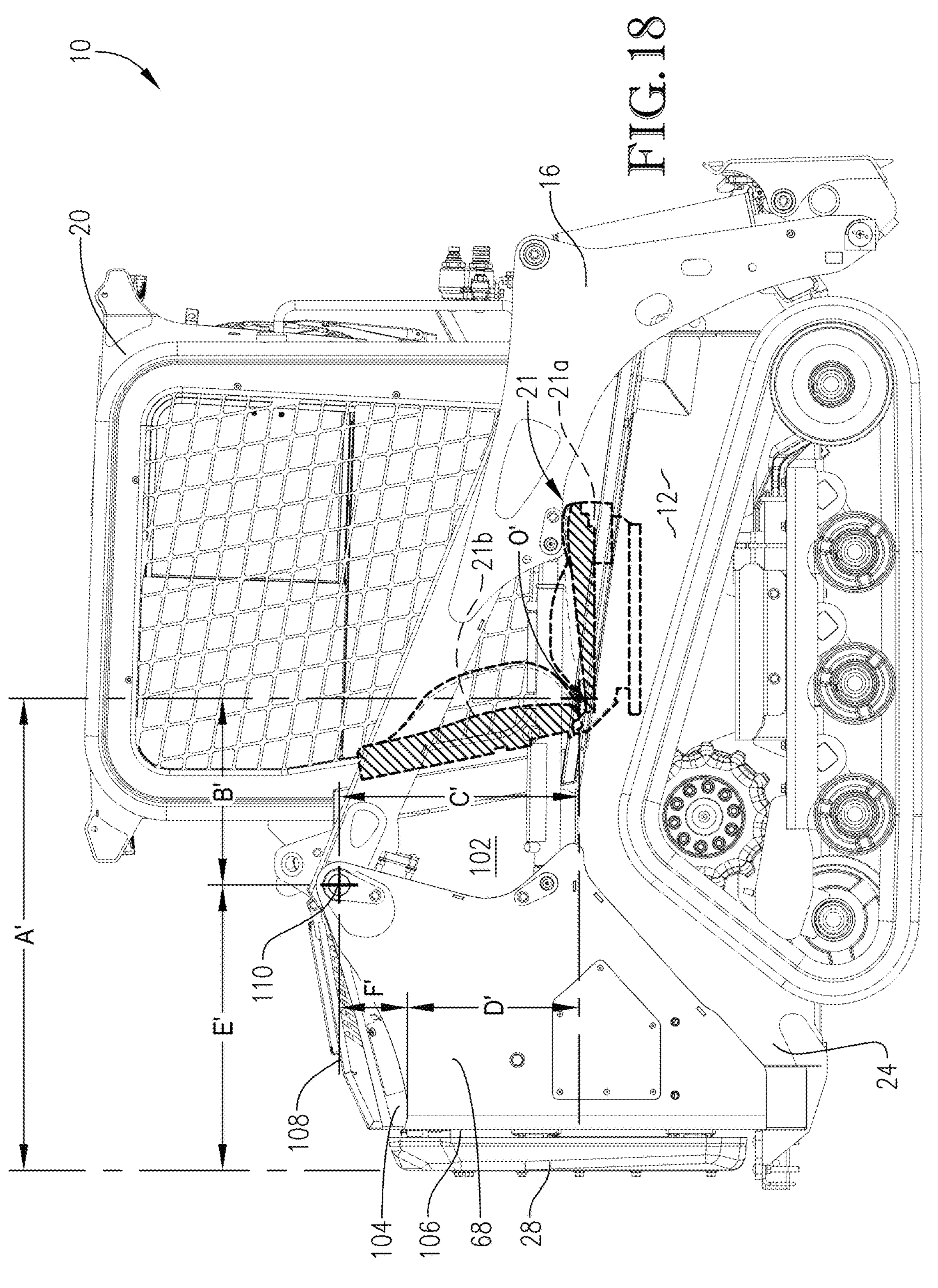
FIG. 18 is a side elevation view of the loader from FIGS. 1-8, without an implement, and illustrating various dimensions between components of the loader.

In more detail, FIG. 18 is a side elevation view of the loader 10 of the present invention that illustrates various dimensions of the loader 10 with respect to the pivot connections 110 and/or the seat 21. It should be understood that the dimensions related to the seat 21 are provided based on an origin point O' located on the seat 21, which is a point on the seat 21 where a seat base 21(*a*) of the seat 21 is joined with a seat back 21(*b*) of the seat 21. Further, the origin point O' is positioned on a front side of the seat 21 and equidistant from lateral sides of the seat 21, as shown in FIG. 15*a,b*.

In view of the above, and with continued reference to FIG. 18, a horizontal distance A' (in a longitudinal direction of the loader 10) from the origin point O' on the seat 21 to the rear end of the loader 10 (e.g., the back side of the access door 28) may be from 37 to 49 inches, from 40 to 46 inches, or about 43 inches. A horizontal distance B' (in a longitudinal direction of the loader 10) from the origin point O' of the seat 21 to the pivot connection 110 of the loader 10 may be from 13 to 21 inches, from 15 to 19 inches, or about 17 inches. A vertical distance C' from the origin point O' of the seat 21 to the pivot connection 110 of the loader 10 may be from about 18 to 26 inches, from 20 to 24 inches, or about 22 inches. A vertical distance D' from the origin point O' of the seat 21 to a lowest point on the top edge of the cover panel 68 of the frame 12 of loader 10 (e.g., a rearward-most portion of the top edge of the cover panel 68) may be from about 13 to 18 inches, from 14 to 17 inches, or about 15.5 inches.

In addition, a horizontal distance E' from the pivot connection 110 of the loader 10 to the rear end of the loader 10 (e.g., the back side of the access door 28) may be from about 22 to 30 inches, from 24 to 28 inches, or about 26 inches. And a vertical distance F' from the pivot connection 110 of the loader 10 to the lowest point on the top edge of the cover panel 68 of the frame 12 of loader 10 (e.g., a rearward-most portion of the top edge of the cover panel 68) may be from about 4 to 8 inches, from 5 to 7 inches, or about 6 inches.

Thus, in view of the dimensions provided above and illustrated on FIG. 18, it can be understood that the pivot connections 110 of the loader 10 are provided relatively close to the cab 20 and to the seat 21 in which the operator of the loader 10 sits while operating the loader 10. Such close proximity may be further illustrated by the ratio of A' to B', which may be at least 2:1, at least 2.25:1, and/or at least 2.5:1. Thus, the pivot connections 110 are generally positioned much closer to the cab 20 and/or to the seat 21 than to the rear end of the loader 10.

The above-described close proximity of the pivot connections 110 with respect to the cab 20 and/or to the seat 21 of the loader 10 is in contrast to many prior art loaders in which connections between their loader arms and their frames which are positioned well behind and/or vertically above the loaders' cabs and/or the seats within the cabs. As such, because of the close proximity between the pivot connections 110 and the cab 20 and/or the seat 21, and given that the rearward portion 12(*b*) of the frame 12 is configured such that the inner panel 102 and the cover panel 68 extend downward from the pivot connections 110 (from front to back of the loader 10), the loader 10 provides for enhanced viewing angles and/or lines of sight for the operator of the loader 10 sitting on the seat 21 within the cab 20. Such preferential viewing angles and/or lines of sight are further enhanced by the top edges of the cover panel 68 being positioned vertically lower than the top edge of the inner panel 102, as was previously described.

Although the invention has been described with reference to the one or more embodiments illustrated in the figures, it is understood that equivalents may be employed and substitutions made herein without departing from the scope of the invention as recited in the claims.

What is claimed is:

1. A work machine configured to operate on a ground surface, said work machine comprising:
- a frame;
- a cab supported by the frame and configured to house an operator of the work machine;
- at least one loader arm supported on the frame and shiftable relative to the frame between a raised position and a lowered position,
- wherein the frame includes (i) a forward portion and a rearward portion, and (ii) a first side and a second side, wherein the first side and the second side are laterally separated from each other,
- wherein at least the first side of the frame comprises an inner panel and a cover panel at the rearward portion of the frame, wherein the cover panel is spaced outwardly from the inner panel, wherein at least a portion of a top edge of the cover panel is positioned vertically lower than a top edge of the inner panel,
- wherein the top edge of the cover panel reduces in height from front to back,
- wherein the top edge of the inner panel reduces in height from front to back, and wherein the top edge of the cover panel reduces in height at a greater rate than the inner panel.

2. The work machine of claim 1, wherein the top edge of the inner panel extends downward generally linearly from front to back.

3. The work machine of claim 1, wherein a top panel extends between an upper region of the inner panel and an upper region of the cover panel.

4. The work machine of claim 1, wherein the cover panel is an exterior most portion of the frame in a lateral direction.

5. The work machine of claim 1, wherein the cab includes a window positioned on a rearward-facing side of the cab, wherein the first side of the frame is configured such that a line of sight extending from a center of the window, tangent to the top edge of the inner panel, and to the ground surface does not contact the cover panel.

6. The work machine of claim 5, wherein the line of sight extends tangent to the top edge of the inner panel at a position located on a rearward half of the top edge.

7. The work machine of claim 1, wherein the at least one loader arm is attached to the first side of the frame of the work machine via a pivot connection formed with both the inner panel and the cover panel of the first side of the frame, wherein a rearward end of the at least one loader arm is positioned between the inner panel and the cover panel.

8. The work machine of claim 7, wherein the top edge of the inner panel extends from adjacent the pivot connection to a rearward end of the frame, and wherein the top edge of the cover panel extends from adjacent the pivot connection to the rearward end of the frame.

9. The work machine of claim 1, wherein the second side of the frame comprises an inner panel and a cover panel at the rearward portion of the frame, wherein the cover panel is spaced outwardly from the inner panel, wherein at least a portion of a top edge of the cover panel is positioned vertically lower than a top edge of the inner panel.

10. The work machine of claim 9, wherein the loader comprises a second loader arm attached to the second side of the loader arm.

11. A work machine configured to operate on a ground surface, said work machine comprising:

a frame;

a cab supported by the frame and configured to house an operator of the work machine;

at least one loader arm supported on the frame and shiftable relative to the frame between a raised position and a lowered position, wherein the frame includes (i) a forward portion and a rearward portion, and (ii) a first side and a second side, wherein the first side and the second side are laterally separated from each other, wherein at least the first side of the frame comprises an inner panel and a cover panel at the rearward portion of the frame, wherein the cover panel is spaced outwardly from the inner panel, wherein at least a portion of a top edge of the cover panel is positioned vertically lower than a top edge of the inner panel, wherein the cab includes a window positioned on a rearward-facing side of the cab, wherein the first side of the frame is configured such that a line of sight extending from a center of the window, tangent to the top edge of the inner panel, and to the ground surface does not contact the cover panel, wherein the line of sight extends at an angle of at least thirty-five (35) degrees below horizontal.

12. A work machine configured to operate on a ground surface, said work machine comprising:

a frame;

a cab supported by the frame and configured to house an operator of the work machine, wherein the cab includes a window positioned on a rearward-facing side of the cab;

at least one loader arm supported on the frame and shiftable relative to the frame between a raised position and a lowered position, wherein the frame includes (i) a forward portion and a rearward portion, and (ii) a first side and a second side, wherein the first side and the second side are laterally separated from each other, wherein at least the first side of the frame comprises an inner panel and a cover panel at the rearward portion of the frame, wherein the cover panel is spaced outwardly from the inner panel, wherein the first side of the frame is configured such that a line of sight extending from a center of the window, tangent to a top edge of the inner panel, and to the ground surface does not contact the cover panel, wherein the line of sight extends at an angle of at least thirty-five (35) degrees below horizontal.

13. The work machine of claim 12, wherein at least a portion of a top edge of the cover panel is positioned vertically lower than the top edge of the inner panel.

14. The work machine of claim 13, wherein the top edge of the cover panel reduces in height from front to back.

15. The work machine of claim 12, wherein the at least one loader arm is attached to the first side of the frame of the work machine via a pivot connection formed with both the inner panel and the cover panel of the first side of the frame, wherein a rearward end of the at least one loader arm is positioned between the inner panel and the cover panel.

16. The work machine of claim 15, wherein the top edge of the inner panel extends from adjacent the pivot connection to a rearward end of the frame, and wherein the top edge of the cover panel extends from adjacent the pivot connection to the rearward end of the frame.

17. A work machine configured to operate on a ground surface, said work machine comprising:

a frame;

a cab supported by the frame and configured to house an operator of the work machine, wherein the cab includes a window positioned on a rearward-facing side of the cab;

at least one loader arm supported on the frame and shiftable relative to the frame between a raised position and a lowered position, wherein the frame includes (i) a forward portion and a rearward portion, and (ii) a first side and a second side, wherein the first side and the second side are laterally separated from each other, wherein at least the first side of the frame comprises an inner panel and a cover panel at the rearward portion of the frame, wherein the cover panel is spaced outwardly from the inner panel, wherein the first side of the frame is configured such that a line of sight extending from a center of the window, tangent to a top edge of the inner panel, and to the ground surface does not contact the cover panel, wherein the top edge of the cover panel reduces in height from front to back, wherein the top edge of the inner panel reduces in height from front to back, and wherein the top edge of the cover panel reduces in height at a greater rate than the inner panel.

* * * * *